US010160691B2

(12) United States Patent
Prat et al.

(10) Patent No.: US 10,160,691 B2
(45) Date of Patent: Dec. 25, 2018

(54) THERMAL INSULATION MATERIAL AND METHOD FOR MAKING THE SAME

(75) Inventors: Evelyne Prat, Pantin (FR); Laurent Frouin, L'Hay les Roses (FR); Pascal Taquet, Grenay (FR); Jamel Mahiaoui, Lyons (FR)

(73) Assignee: KERNEOS, Puteaux (FR)

( * ) Notice: Subject to any disclaimer, the term of this patent is extended or adjusted under 35 U.S.C. 154(b) by 367 days.

(21) Appl. No.: 13/522,279

(22) PCT Filed: Jan. 13, 2011

(86) PCT No.: PCT/FR2011/050066
§ 371 (c)(1),
(2), (4) Date: Jul. 13, 2012

(87) PCT Pub. No.: WO2011/086333
PCT Pub. Date: Jul. 21, 2011

(65) Prior Publication Data
US 2012/0286190 A1 Nov. 15, 2012

(30) Foreign Application Priority Data
Jan. 13, 2010 (FR) ...................................... 10 50212

(51) Int. Cl.
C04B 38/10 (2006.01)
C04B 38/02 (2006.01)
(Continued)

(52) U.S. Cl.
CPC .............. *C04B 38/02* (2013.01); *C04B 28/06* (2013.01); *C04B 28/065* (2013.01); *C04B 28/16* (2013.01);
(Continued)

(58) Field of Classification Search
CPC . C04B 38/10; C04B 22/0093; C04B 38/0009; C04B 38/0051
(Continued)

(56) References Cited

U.S. PATENT DOCUMENTS 3,989,534 A * 11/1976 Plunguian ............... C04B 28/02
106/646
4,218,490 A 8/1980 Phillips et al.
(Continued)

FOREIGN PATENT DOCUMENTS

AT           9 511 U1      11/2007
CN        86100899 A       10/1986
(Continued)

OTHER PUBLICATIONS

Taylor, H.F.W. "Cement Chemistry." 1997. Thomas Telford Publishing. 2nd Edition. pp. 295-298. Retrieved from http://goo.gl/l9dqlT.*

(Continued)

*Primary Examiner* — James E McDonough
(74) *Attorney, Agent, or Firm* — Young & Thompson

(57) ABSTRACT

A cellular structure thermal insulation material includes by weight as compared to the material total weight:
  from 4 to 96% of a hydraulic binder, which prior to being contacted with water, includes at least one phase selected from C3A, CA, C12A7, C11A7CaF2, C4A3$ (Yee lemite), C2A(1-x)Fx (where x belongs to [0, 1]), hydraulic amorphous phases having a C/A molar ratio ranging from 0.3 to 15 and such that cumulated amounts of Al2O3 of these phases be ranging from 3 to 70% by weight of the hydraulic binder total weight,
  from 4 to 96% of at least one filler,
  the material having a pore volume ranging from 70% to 95%. The use of a mineral foam for making thermal
(Continued)

Figure 1:
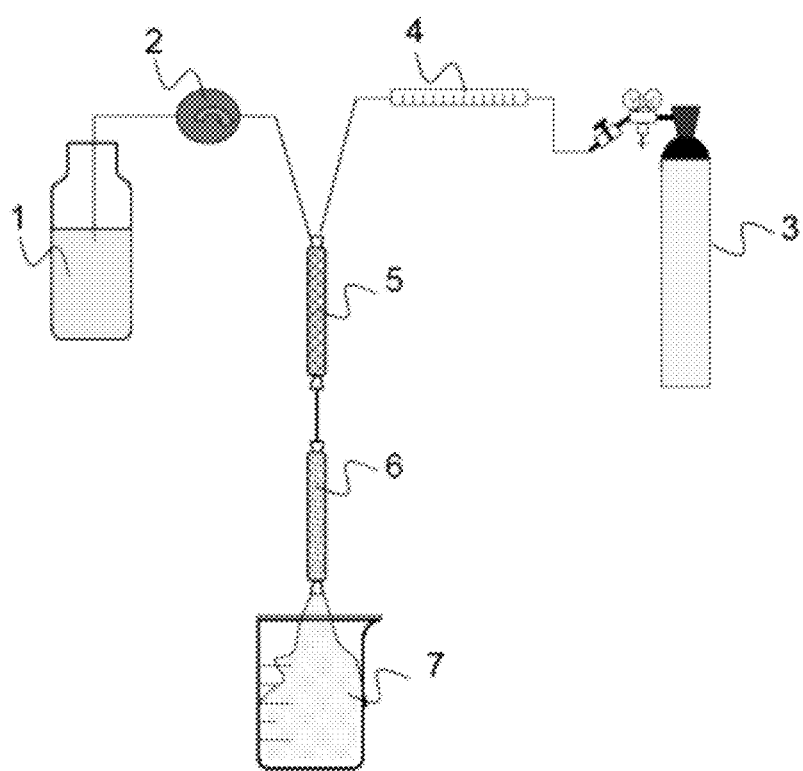

insulation material as well as methods for making the mineral foam are also described.

16 Claims, 9 Drawing Sheets

(51) Int. Cl.
  *C04B 28/06* (2006.01)
  *C04B 28/16* (2006.01)
  *C04B 111/28* (2006.01)
(52) U.S. Cl.
  CPC ......... *C04B 38/106* (2013.01); *C04B 2111/28* (2013.01); *Y02W 30/94* (2015.05); *Y02W 30/97* (2015.05)
(58) Field of Classification Search
  USPC .......................................... 106/672, 692, 646
  See application file for complete search history.

(56) References Cited

U.S. PATENT DOCUMENTS

| | | | |
|---|---|---|---|
| 4,350,533 A * | 9/1982 | Galer | C04B 7/323 |
| | | | 106/695 |
| 4,670,055 A | 6/1987 | Koslowski | |
| 4,746,365 A * | 5/1988 | Babcock | C04B 24/26 |
| | | | 106/695 |
| 5,109,030 A * | 4/1992 | Chao | C04B 24/26 |
| | | | 521/149 |
| 5,520,729 A | 5/1996 | Engert et al. | |
| 6,443,258 B1 * | 9/2002 | Putt | B28C 5/381 |
| | | | 181/294 |
| 7,208,040 B2 | 4/2007 | Amathieu et al. | |
| 7,288,147 B2 | 10/2007 | Christensen et al. | |
| 2004/0040474 A1 * | 3/2004 | Perez-Pena | C04B 28/04 |
| | | | 106/808 |
| 2005/0126781 A1 | 6/2005 | Reddy et al. | |
| 2007/0074642 A1 | 4/2007 | Amathieu et al. | |
| 2009/0188670 A1 * | 7/2009 | Xu | C04B 28/06 |
| | | | 166/293 |
| 2010/0140531 A1 | 6/2010 | Prat et al. | |

FOREIGN PATENT DOCUMENTS

| | | |
|---|---|---|
| CN | 1656040 A | 8/2005 |
| DE | 27 14 735 A1 | 10/1978 |
| DE | 3 227 079 A1 | 1/1984 |
| EP | 0 121 524 B1 | 1/1989 |
| EP | 0 628 523 A1 | 12/1994 |
| EP | 2 045 227 A1 | 4/2009 |
| EP | 2 093 201 A2 | 8/2009 |
| FR | 2 913 351 A1 | 9/2008 |
| FR | 2 929 270 A1 | 10/2009 |
| GB | 1 578 470 A | 12/1977 |
| GB | 1 506 417 A | 4/1978 |
| GB | 2 162 506 A | 2/1986 |
| RU | 2013421 C1 | 5/1994 |
| RU | 2036886 C1 | 6/1995 |
| RU | 2070874 C1 | 12/1996 |
| RU | 2194684 C2 | 12/2002 |
| RU | 2305087 C1 | 8/2007 |
| SU | 444750 A1 | 9/1974 |
| WO | 00/23395 A1 | 4/2000 |
| WO | 2006/067064 A1 | 6/2006 |
| WO | 2008/020246 A2 | 2/2008 |

OTHER PUBLICATIONS

Ghosh, S.N. "Advances in Cement Technology: Chemistry Manufacture and Testing". 1983. pp. 275.*
International Search Report, dated Aug. 29, 2011, from corresponding PCT application.
Russian Office Action dated Jan. 15, 2015, in corresponding Russian Application.

* cited by examiner

THERMAL INSULATION MATERIAL AND METHOD FOR MAKING THE SAME

BACKGROUND OF THE INVENTION

Field of the Invention

The present invention relates to a cellular structure thermal insulation material, a mineral foam from which to obtain said thermal insulation material as well as the methods for making such materials.

Description of the Related Art

There is nowadays a substantially increasing demand for thermal insulation materials. Indeed, one believes that the building industry in France accounts for about 46% of total energy costs and for 25% of carbon dioxide total emission. Building energy performance regulations makes provision for substantial reductions in domestic energy consumption.

To be able to aim at those objectives, not only consumers will have to deeply change their life habits but also fundamental innovations in the field of building thermal insulation technologies will have to be achieved.

In addition, in order to efficiently perform the renovation of the existing home park, it is important for such new technologies to be readily implemented by users, while being financially compatible with home owner budgets.

Amongst the insulation techniques, the distinction should be made, especially on the renovation market, between techniques dedicated to inner insulation and to outer insulation.

Innovative building techniques are also emerging such as Monowall bricks and the use of bearing panels of the sandwich type comprising a framework filled with insulation materials.

Insulation materials that are traditionally used nowadays in the hereabove mentioned insulation techniques do vary in nature:
  mineral: glass wools, rock wool, vermiculites,
  polymers: expanded polystyrene foam (EPS) and extruded polystyrene foam (XPS), polyurethane foam (PU), polyisocyanurate foam (polyisocyanurate),
  naturally originating from plants or animals: bulk cellulose or injected cellulose, hemp, flax, wood (fibers, chips, board), straw, cork, cotton, coco, sheep's wool, duck feathers.

Their intrinsic performance as regards thermal insulation is characterized by the coefficient of thermal conductivity $\lambda$. This coefficient $\lambda$ corresponds to the heat flux crossing over 1 $m^2$ of a 1 m-thick wall, when the difference in temperature between both sides equals 1 degree ($\lambda$ is expressed in W/m·° C. (Celsius or Kelvin)). The lower such coefficient is, the more performant the material from the thermal insulation point of view.

All the previously mentioned materials suffer from drawbacks and use limitations. Rock wool, glass wool and vermiculites tend to "pack down" over time leading to efficiency loss. In addition, to satisfy the requirements of the new regulations governing energy performance (2005 Thermal Regulation), it is necessary for achieving such performances to increase the thickness of the materials, which causes problems of useful space loss (for example: 400 mm of thickness for glass wool . . . ). The improvements in the intrinsic efficiency of this type of materials by increasing the density thereof remain limited.

Polymers which possess thermal conductivity values within the lower range (0.029 for polyisocyanurate) suffer from drawbacks that are related to the problematic recycling, and especially to the need to separate the polymer from the building materials for waste disposal. Moreover, they do raise problems of fire resistance and potential release of toxic fumes in case of fire (PU foams very especially).

The materials of natural origin by definition have performances that do "vary" from one batch to the other and suffer from durability problems due to the compaction phenomenon.

For the sake of clarity hereafter, the following conventions will be adopted:

All weight percentages, unless otherwise specified, are expressed as related to the weight of dry matter in the compositions.

Cement Slurry:

As used herein, a cement slurry is intended to mean a composition in its plastic state obtained by adding at least one mineral hydraulic binder, water, and optionally specific additives, calcium sulfate, and fillers.

Aqueous Foam:

As used herein, aqueous foams are intended to mean those foams composed of at least one gas, in particular air, and one solvent which may be water. Those foams do not contain any mineral binder.

They are characterized in the initial time by their initial coefficient of expansion=total volume in the initial time/volume of solution used for generating the foam.

As used herein, the initial time is intended to mean the moment when the operator has achieved the air entrainment for generating the foam, such as described in the patent FR2913351 (A1).

Inherently unstable, they are further characterized by their stability over time commonly measured through half-life, that is to say the time required for obtaining a drainage equivalent to the half of the whole liquid used for producing the same.

The stability of these foams may be improved by suitably selecting surfactants combined with foam stabilizers such as for example alkanolamides, hydrocolloids, proteins mentioned in the patent applications and the patents WO/2008/020246. WO/2006/067064 and U.S. Pat. No. 4,218,490.

Mineral Foam:

As used herein, a mineral foam is intended to mean a foam comprising at least one gas, in particular air, at least one solvent which may be water, at least one mineral hydraulic binder and at least one filler, notably a fine, in the hereunder defined amounts.

These foams like the preceding ones will change over time and will be only stabilized when the mineral binder will have reacted to "freeze" the structure of the material.

Hardened Mineral Foam:

As used herein, mineral foams are intended to mean those mineral foams that are finally obtained after the reaction (hydration) of the hydraulic binder which will "freeze", via the percolation of the hydrate network, the backbone of the mineral foam. A mineral foam also means the cellular structure thermal insulation material obtained through hardening of the mineral foam.

As an alternative of the invention, the thermal insulation material is obtained from a cement slurry based on an aluminous hydraulic binder comprising low-density hollow fillers, through hardening of the cement slurry.

Aluminous Hydraulic Binder (Abbreviated AHB):

As used herein, aluminous hydraulic binders are intended to mean hydraulic binders comprising at least one phase selected from C3A, CA, C12A7, C11A7CaF2, C4A3$ (Ye'elimite), C2A(1-x)Fx (where x belongs to [0,1]), hydraulic amorphous phases having a C/A molar ratio ranging from 0.3 to 15 and such that cumulated amounts of $Al_2O_3$ in these phases range from 3 to 70% by weight of the hydraulic binder total weight, preferably from 7 to 50% by weight and better from 20 to 30% by weight.

In particular embodiments, this binder may also optionally contain, by weight as related to the binder total weight:

from 0 to 90%, preferably up to 70%, even more preferably up to 50% and most preferably up to 40% of calcium sulfate or of a calcium sulfate source, and, from 0 to 10%, preferably from 0 to less than 5% of Portland cement. At the same time, hardened mineral foams based on hydraulic binder have been developed for various applications. Many patents describe especially how to make cellular concretes by incorporating aqueous foams or by generating gases in situ through aluminium metal decomposition.

Lightweight concretes having improved freezing-thawing resistance properties thanks to an air bubble network absorbing stresses and restraining the crack propagation have been extensively documented and published. The U.S. Pat. No. 7,288,147 may especially be mentioned.

It is also known to use light-weight cement slurries for cementing oil wells in unstable rocks and lands such as the deep-sea sedimentary environments described in the patent application US 2005/126781.

Hardened mineral foams are known from GB-1,506,417, that are obtained from binders of the ettringite type, that is to say from mixtures of aluminous cement and calcium sulfate. U.S. Pat. No. 4,670,055 also describes binders based on aluminate and calcium sulfate. However, these binders are used for making calcium silicate-based foam blocks with a very high density. Hardened mineral foams are known from GB-1578470 and GB-2162506, that are obtained from aluminous cement and high amounts of silicates. The cellular materials obtained after hardening of these mineral foams as a drawback suffer from having poor mechanical resistance properties and very high densities.

WO00/23395 describes aerated mortar compositions based on calcium aluminate and comprising a filler in the form of aggregate. The insulation materials obtained from these compositions have a very high density and therefore insufficient performances as regards insulation. The document RU2305087 describes hardened mineral foams based on calcium aluminate, gypsum and sand. Insulation materials obtained in this document have a high thermal conductivity and a high density. Hardened mineral foams have also been developed for fire protection applications wherein, thanks to their intrinsic non combustibility characteristics or even refractory properties, they offer an obvious advantage over materials comprising organic base or polymer components. However, while these hardened mineral foams fully meet the fire protection requirements, the conductivity values thereof λ remain too high for applications of the thermal insulation type, which require conductivity values at 20° C. lower than or equal to 0.2 W/m·° C., even more preferably lower than or equal to 0.15 W/m·° C., even lower than or equal to 0.08 W/m·° C. and most preferably lower than or equal to 0.045 W/m·° C. Properties of 0.2 W/m·° C. have been obtained with silica-derived materials, as described in DE3227079. However such materials as a drawback suffer from possessing high densities (400 to 600 kg/m³), poor mechanical performances and poor fire resistance properties. Low thermal conductivity materials have also been described in EP 2 093 201. There are lime-based foams obtained from a mixture of hydraulic lime and cement. However, the use of hydraulic lime unfortunately leads to the formation of products with a very high density. Aluminous cements have also been described in JP-06056497 to obtain such conductivity performances. However these materials are substantially based on pumice, and have a very high density (800 kg/m³) because they are poorly aerated. And yet it is technically very difficult to attain these thermal conductivity values at 20° C. while keeping a material having a minimal mechanical behavior and preserving its physical integrity, that is to say a material that will not collapse under its own weight. Moreover obtaining materials with a lower density than that of the prior art is also a problem which has been solved by the present invention.

The intrinsic insulating performance of a material resulting from a hardened cement based mineral foam will be the higher as the gas bubbles fraction in the material will be high and said bubbles will be as fine as possible and not connected so as to avoid thermal bridges. And yet an increase in the pore volume for a given pore size distribution, that is good for the insulating character also results in an increased weakness of the material which explains how fire-resistant hardened mineral foams do reach such limit.

Finally, a method for making thermo-insulating hardened mineral foams is described in the patent EP 0 121 524 comprising the provision of an aqueous foam stream through mechanical foaming with air, of an aqueous solution of polyvinyl alcohol and a dispersant followed with the addition to the aqueous foam stream of an aqueous solution comprising magnesium oxide and barium metaborate. In this patent, the provision of a stable aqueous foam is enabled through the combined use of polyvinyl alcohol and sodium or barium metaborate. Boric acid salt acts here as a cross-linking agent for polyvinyl alcohol enabling to fix the size of the air bubbles included in the material. A chemical stabilization of the aqueous foam therefore occurs.

There is thus a need for new solutions that would be at the same time efficient, easy to implement and cost effective while respecting the safety of the operators and users and enabling to obtain a good compromise between workability, mechanical behavior, low density and thermal insulation.

SUMMARY OF THE INVENTION

The applicant discovered surprisingly that particular aluminous hydraulic binder compositions make it possible to incorporate great amounts of air in a finely divided form, especially in the form of bubbles, or in the form of low density hollow fillers and to obtain after hardening of the binder a material with a low thermal conductivity and a high mechanical strength, especially a high compressive strength. Thus a cellular structure material could be obtained from a hardened cement based mineral foam having outstanding thermal insulation properties but also with a sufficient short-term mechanical strength for this material to be used in many applications requiring especially the placing in situ of said material.

Such compressive strength values cannot be obtained when binders are used that are essentially made of Portland cement. The present invention relates to a cellular structure thermal insulation material comprising by weight as compared to the material total weight:

a) from 4 to 96% of a cement matrix obtained by hydration of a hydraulic binder that is characterized, prior to being contacted with water, in that it comprises at least one phase selected from C3A, CA, C12A7, C11A7CaF2, C4A3$ (Ye'elimite), C2A(1-x)Fx (where x belongs to [0, 1]), hydraulic amorphous phases having a C/A molar ratio ranging from 0.3 to 15 and such that cumulated amounts of $Al_2O_3$ of these phases be ranging from 3 to 70% by weight of the hydraulic binder total weight, preferably from 7 to 50% by weight and preferably 25 from 20 to 30% by weight, b) from 4 to 96% of at least one filler, preferably a fine.

Said material advantageously has a coefficient of thermal conductivity at 20° C., lower than or equal to 0.2 W/m° C., better lower than or equal to 0.15 W/m° C., preferably lower than or equal to 0.08 W/m° C., even more preferably lower than or equal to 0.045 W/m° C., and most preferably, lower than or equal to 0.04 W/m° C.

Preferably, the binder of the insulating material of the invention comprises in addition as related to the binder total weight from 0 to 90%, preferably up to 70%, even more preferably up to 50% and most preferably up to 40% of calcium sulfate or of a calcium sulfate source, and, from 0 to less than 5% of Portland cement.

Preferably the cement matrix accounts for 10 to 80%, and better for 20 to 60% by weight of the cellular structure thermal insulation material.

As used herein, "hydration of a hydraulic binder" is intended to mean the contacting of the hydraulic binder with water, the weight ratio of water to hydraulic binder ranging typically from 0.1 to 0.7, preferably from 0.15 to 0.5.

Advantageously, the mineral foams of the invention are prepared by using water as a solvent and this weight ratio characterizes the mineral foams of the invention.

Such hydration may be effected when preparing the cement slurry as described hereafter, or at any time by introducing water or an aqueous solvent when preparing the mineral foam.

The invention further relates to a method for making the thermal insulation material, or hardened mineral foam, this method comprising the production of a mineral foam or a cement slurry comprising low-density hollow fillers which will be described hereunder and a step of setting or hardening, which will take more or less time depending on the additives used.

The invention further relates to the mineral foam enabling to obtain, after hardening, the thermal insulation material as well as the method for making the mineral foam.

The invention moreover relates to the cement slurry comprising low-density hollow fillers enabling to obtain, after hardening, the thermal insulation material as well as the method for making this cement slurry.

For attaining thermal conductivity values compatible with applications of the thermal insulation type, it is not only necessary to form a very fine aqueous foam in the initial state, but also it is advisable to have a hydraulic matrix which enables to obtain a mineral foam having on the one hand a sufficient workability to allow the placing thereof and on the other hand the very early development of a hydrate network for stabilizing the mineral foam in its plastic configuration before the Ostwald ripening phenomenon occurs.

The applicant discovered that the use of aluminous hydraulic binders AHB is particularly well adapted to obtain a compromise between workability properties of the foam and the early development of the hydrate network.

In an alternative, these properties may be obtained by using low density hollow fillers dispersed in a cement slurry based on such aluminous hydraulic binders AHB.

In a preferred alternative, these properties are improved by using fillers selected from reactive fillers.

The very high hydraulic potential of these phases, which develops as soon as the binders AHB is contacted with water, immediately leads to the nucleation of a great amount of small-sized hydrates (which may have a submicrometer to micrometer size) which:

firstly stabilize the mineral foam in its plastic phase (thus preventing the Ostwald ripening) for a time period which may be adjusted depending on the desired workability, between 5 and 30 minutes, even to more than 30 minutes secondly enable through percolation the formation of a mineral hydrated skeleton which will ensure the early acquisition of the mechanical performances and allow the provision of the hardened mineral foam of the invention and/or of the thermal insulation material of the invention.

It is particularly interesting to use hydraulic binders comprising calcium sulfate or a source of calcium sulfate, so as to promote the production of ettringitic and hydrated alumina phases which have both advantages to reinforce the mechanical properties of the hardened mineral foam and to also improve the fire resistance of the latter.

These binders are particularly interesting for the provision of a high early mechanical strength. At 24 h, the materials of the invention possess at least 80% of their final mechanical strength, which is not the case for those materials of which the binder is essentially made of Portland cement.

These binders also enable to control and to limit the shrinkage of the material upon hardening.

The use of hydraulic binder AHB of the invention enables to obtain hardened mineral foams that are free of polymers, especially of EPS, XPS, PU and PIR type polymers, these hardened mineral foams having the expected properties of thermal conductivity and good fire resistance.

This type of hydraulic binders AHB enables therefore to improve the fire resistance of the materials, which represents a clear improvement over foams based on polymers of the EPS, XPS, PU and PIR type.

Moreover the use of this type of hydraulic binder AHB improves the mineral foam production reliability in industrial conditions since the susceptibility to Ostwald ripening becomes less problematic and since the optimization of the surfactant and foam stabilizer system becomes therefore less crucial.

As non limitative examples, the binders of the invention will be able to contain aluminous cements and cements of the calcium sulphoaluminate type which will be able to be optionally associated with a source of calcium sulfate.

Non limitative examples of commercially available aluminous cements include for example Secar 71, Secar 51, Fondu cement, Ternal RG, Ternal EV marketed by the Kerneos company, and aluminous cements marketed by the Calucem, Cementos Molins companies and by the TMC and Denka companies in Japan. Non limitative examples of commercially available sulpho-aluminous cements include for example Rapidset marketed by CTS, Alipré cement marketed by the Italcementi company, calcium sulphoaluminates marketed by Polarbear and Lionhead.

The aluminous hydraulic binders AHB of the invention, as a consequence of their reactivity, enable to rapidly develop a hydrate network which percolates, freezes the bubble diameter and forms the mineral skeleton of the hardened mineral foam. This phenomenon occurs whatever the agent used to obtain the aqueous foam, that is to say whatever the foaming agent, the air-entraining agent or the gas-generating agent. Indeed, it seems that the mechanisms underlying the invention correspond to a mineral stabilization obtained thanks to the formation of the hydrates which freeze at an early stage the gas or air inclusions. Therefore a hardened mineral foam is thus obtained, having small-sized bubbles that are very homogeneously distributed.

The invention therefore differs from the hardened mineral foam compositions described in the prior art and especially in the patent EP 0 121 524 in the specific choice of a hydraulic binder AHB. Indeed, the high reactivity of the mineral compounds used enables to obtain a hardened mineral foam of a superior quality without requiring for example the use of the polyvinyl alcohol+boric acid salt combination. For this reason, the mineral foam as well as the hardened mineral foam and the cellular structure thermal insulation material of the invention do preferably not contain the polyvinyl alcohol+boric acid salt combination.

As compared to the prior art which deals with the optimization of the surfactant systems in order to limit the Ostwald ripening, the present invention enables therefore to manage the setting of the mineral system in the early stages and to overcome, amongst others, the Ostwald ripening which results in an increase in the bubble size and thus in an increase in the coefficient of thermal conductivity and a reduction of the mechanical strength.

The stabilization of the hardened mineral foam or of the cement slurry obtained thanks to the high reactivity of the hydraulic binders AHB associated, or not, with calcium sulphates according to the invention enables, as compared to an improvement of the aqueous foam stability or of the mineral foam stability obtained by the relevant selection of surfactants combined with polymers or other aqueous foam stabilizers well known from the person skilled in the art such as proteins, polymers of natural or synthetic origin, to obtain in a reliable and robust manner a hardened mineral foam having a fine and homogeneous bubble network leading after setting to a cellular structure thermal insulation material having a lower thermal conductivity while retaining good mechanical strength characteristics.

As compared to the mineral foams of the prior art comprising large amounts of silicates, the hardened mineral foams of the invention have a lower density associated with a high mechanical strength.

As an alternative of the invention, the porosity may be provided by the presence of low density hollow fillers in the cement slurry, optionally associated with an aqueous foam.

The systems of the invention as a non negligible additional advantage have a good short-term mechanical strength expressing especially through the following compressive strength values after 3 hours:

CS values higher than 0.2 MPa, preferably higher than 0.3 MPa, and even more preferably higher than or equal to 0.5 MPa for materials having lambda values lower than 0.08 W/m° C.

CS values higher than 0.8 MPa, preferably higher than 1 MPa and even more preferably higher than 1.5 MPa for lambda values ranging from 0.08 to 0.2 W/m° C.

The systems of the invention are characterized by the following compressive strength values after 24 hours:

CS values higher than 0.3 MPa, preferably higher than or equal to 0.5 MPa for materials having lambda values lower than 0.08 W/m° C.

CS values higher than 1 MPa preferably higher than 1.5 MPa for lambda values ranging from 0.08 to 0.2 W/m° C.

The thermal insulation materials of the invention are also characterized by a shrinkage value lower than 500 µm/m, preferably lower than 400 µm/m, advantageously lower than 300 µm/m and even more preferably lower than 200 µm/m. This shrinkage is measured according to the method taught by the NF EN 128 08-4 standard.

This property advantageously provides the materials of the invention with a good adhesion to walls for filling hollow building elements and a better stability over time. This property is particularly important when placing the foam in situ: building renovation, composite slab construction, to avoid the formation of thermal bridges.

Finally, the mineral foams of the invention as a further advantage allow to modulate the setting time. This is profitable as compared to mineral foams comprising essentially Portland cement as a binder which does not intrinsically develop a so high hydrate nucleation in the early stages.

Mineral foams based on Portland cement (without accelerator systems) have, typically, setting times exceeding 2 hours.

The mineral foams and cement slurries of the invention may have a workability as short as 5 minutes (flash setting) or as long as 30 minutes. The mineral foam of the invention therefore has a workability which can be easily adjusted to values ranging from 5 to 30 minutes, or even to values exceeding 30 minutes. The fact for the setting time to be adjustable is advantageous in that for making precasts, a quick setting of from 20 to 30 minutes is interesting whereas for applications requiring the placing in situ of the mineral foam, longer setting times, exceeding 30 minutes, or even exceeding 1 h or 2 hours, may be advantageous. Thus, with hydraulic binders AHB workabilities of more than one hour, or even of more than two hours may be obtained, while retaining a fast mechanical performance acquisition kinetics after the period of workability. Small-sized hydrates precipitated during the period of workability make the mineral foam stabilize without affecting the plastic characteristics thereof, which is known from the person skilled in the art.

The compromise between workability time and mechanical performance acquisition may be readily adjusted by using the accelerator/retarder additive systems known from the person skilled in the art and described hereafter.

BRIEF DESCRIPTION OF THE DRAWING FIGURES

Figure 2:
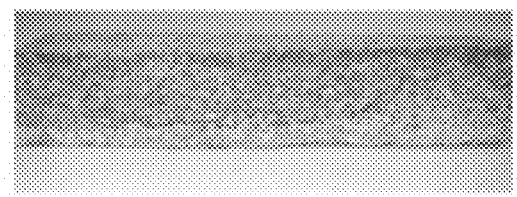
Figure 2:
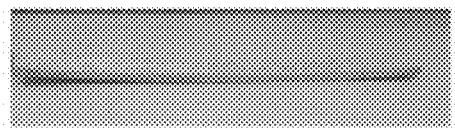
Figure 2:
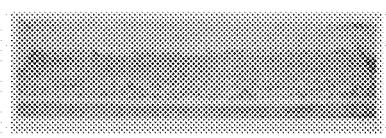
Figure 3:
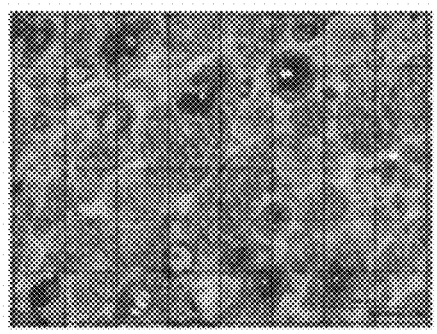
Figure 3:
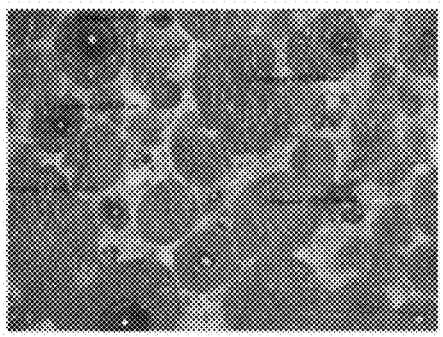

The rest of the description does refer to appended Figures which show:

On FIG. 1, a diagram of a device for making an aqueous foam or a mineral foam of the invention;

On FIGS. 2a to 2c), a photograph of a cellular structure thermal insulation material or hardened mineral foam of the invention (2a), of a material based on Portland cement without setting accelerator (2b) and with setting accelerator (2c); and On FIGS. 3a and 3b, optical microscopy images (×5) of cross-sections of the material of the FIG. 2a.

FIGS. 4 to 10 show optical microscopy images (×5) of cross-sections of the materials of examples 3 to 7 and 9.

DETAILED DESCRIPTION OF THE INVENTION

The cellular structure thermal insulation material or hardened mineral foam of the invention does moreover possess the following characteristics, either alone or in combination:

it has a pore volume ranging from 70% to 95%, preferably from 80% to 95%;

it has a density lower than or equal to 500 Kg/m$^3$, preferably lower than or equal to 300 Kg/m$^3$. Advantageously, it has a density which may be from 80 to 250 Kg/m$^3$;

it has a cell mean size of less than 500 µm, preferably of less than 400 µm, advantageously of less than 300 µm. Such cell sizes have been observed through optical microscopy of cross-sections of materials;

it has a compressive strength Cs at 3 hours higher than or equal to 0.2 MPa, preferably higher than or equal to 0.3 and even more preferably higher than or equal to 0.5 MPa, it has a fire resistance at 600° C., preferably at 900° C. and even more preferably at 1200° C. for three hours.

Surprisingly, as compared to materials of the hardened mineral foam type of the prior art, the thermal insulation materials of the invention may have a high pore volume and a low density while retaining a very good mechanical strength. The combination of these properties results from the choice of a particular aluminous hydraulic binder composition which enables to incorporate a high amount of air bubbles or a high amount of hollow fillers while retaining a mineral network provided with a strong cohesion.

the hydraulic binder AHB may comprise by weight as related to the hydraulic binder total weight:

from 10 to 90%, preferably from 10 to 70%, even more preferably from 10 to 50% and most preferably from 20 to 40% by weight of calcium sulfate.

the hydraulic binder AHB may further comprise from 0 to 10% by weight of Portland cement, preferably from 0 to less than 5% and even more preferably from 2 to less than 5% of Portland cement.

The hydraulic binder may further comprise one or more additives included selected from foaming agents and foam crosslinking agents, setting accelerators, setting retarders, rheology modifiers and water retaining agents, dispersants and superplasticizers, preferably said additive(s) accounting for up to 15% by weight, preferably up to 10% and typically for 5% or less of the hydraulic binder total weight.

Especially setting-time controlling agents selected from setting accelerators and setting retarders may represent from 0.05 to 15% by weight, preferably from 0.1 to 10% by weight as related to the hydraulic binder total weight.

Fillers or fines (fillers which particle size by convention is of less than 100 µm) are typically selected from silica fume, blast furnace slag, steel slag, fly ash, limestone fillers, particulate silica, silicas including pyrogenated and precipitated silicas, silicas recovered in rice husks, diatomaceous silicas, calcium carbonates, calcium silicates, barium sulfate, metakaolins, titanium, iron, zinc, chromium, zirconia, magnesium metal oxides, alumina under its various forms (hydrated or not), alumina hollow beads, boron nitride, lithopone, barium metaborate, calcinated, standard or expanded clays, perlite, vermiculite, pumices, rhyolite, chamotte, talc, mica, optionally hollow, glass beads or expanded glass granules, silicate foam grains, silica aerogels, sands, broken gravels, gravels, pebbles, carbonate black, silicon carbide, corundum, rubber granules, wood, straw.

According to the invention, fines are mineral fillers the components of which have a size of less than 100 micrometers.

The hardened mineral foam may further comprise one or more other components such as additives introduced when preparing the binder or the mineral foam, preferably said additive(s) represent up to 15% by weight, typically from 3 to 10% of the material total weight. These additives may be selected from foaming agents and foam stabilizers, setting accelerators, setting retarders, rheology modifiers and water retaining agents, dispersants or superplastifiants.

The hardened mineral foam or the cement slurry may also contain other additives such as waterproofing agents as well as thermoplastic or thermosetting polymers introduced for all or part thereof, either when preparing the binder or the mineral foam or by spraying or impregnating onto the hardened mineral foam. When used, these additives represent typically from 0.5 to 25%, preferably from 1 to 15% by weight of the cellular structure thermal insulation material total weight.

The hardened mineral foam or the cement slurry of the invention may further comprise fibers or microfibers, for example cellulose, polyvinyl alcohol, polyamide, polyethylene, polypropylene, silicone, metal and/or glass fibers, fibers of natural origin such as hemp fibers, coco fibers, cotton fibers, wood fibers; having preferably a length ranging from 20 µm to 6 mm and a diameter of from 10 to 800 µm.

These fibers are introduced into the binder composition or into the mineral foam and may represent up to 2% by weight of the cellular structure thermal insulation material total weight.

The cellular structure thermal insulation materials of the invention have preferably a density lower than or equal to 500 Kg/m$^3$ preferably lower than or equal to 300 Kg/m$^3$. Advantageously, they have a density which may be from 80 to 250 Kg/m$^3$.

Preferably the thermal insulation material of the invention contains from 1 to 40% of low density hollow fillers, advantageously from 5 to 30% by weight as compared to the thermal insulation material total weight.

In one embodiment, the cellular structure thermal insulation material has advantageously the following composition by weight as compared to the material total weight:

a) from 50 to 96%, preferably from 70 to 96% and even more preferably from 90 to 96% of a hydraulic binder AHB such as defined hereabove containing:

from 10 to 90%, preferably from 10 to 70%, even more preferably from 10 to 50% and even more preferably from 20 to 40% by weight of calcium sulfate, and, b) from 1 to 40% of at least one material selected from reactive fillers, c) from 0.5 to 5% of a material selected from reactive filler activators, d) from 0 to 2%, preferably from 0 to 1% of fibers or microfibers, and e) from 0 to 15% of additives selected from foaming agents and stabilizers or foam crosslinking agents, setting accelerators, setting retarders, rheology modifiers and water retaining agents, dispersants and superplastifiants.

In another embodiment of the invention, the cellular structure thermal insulation material has advantageously the following composition by weight as compared to the material total weight:

a) from 50 to 96%, preferably from 70 to 96% and even more preferably from 90 to 96% of a hydraulic binder AHB such as defined hereabove containing:

from 10 to 90%, preferably from 10 to 70%, even more preferably from 10 to 50% and even more preferably from 20 to 40% by weight of calcium sulfate, and, b) from 1 to 80%, preferably from 1 to 60%, advantageously from 1 to 40% of at least one material selected from low density hollow fillers, c) from 0 to 2%, preferably from 0 to 1% of fibers or microfibers, and d) from 0 to 15% of additives selected from foaming agents and stabilizers or foam crosslinking agents, setting accelerators, setting retarders, rheology modifiers and water retaining agents, dispersants and superplastifiants.

In one embodiment, the cellular structure thermal insulation material has advantageously the following composition by weight as compared to the material total weight:

a) from 50 to 96%, preferably from 70 to 96% and even more preferably from 90 to 96% of a hydraulic binder AHB such as defined hereabove containing:

from 10 to 90%, preferably from 10 to 70%, even more preferably from 10 to 50% and even more preferably from 20 to 40% by weight of calcium sulfate, and, from 0 to less than 5% by weight of Portland cement, b) from 4 to 50%, preferably from 4 to 30% and even more preferably from 4 to 10% of fines, c) from 0 to 2%, preferably from 0 to 1% of fibers or microfibers, and d) from 0 to 15% of additives selected from foaming agents and stabilizers or foam crosslinking agents, setting accelerators, setting retarders, rheology modifiers and water retaining agents, dispersants and superplastifiants. The material of the invention may possess an open- or closed-cell structure, typically both open and closed.

The invention further relates to the mineral foam which acts as a precursor for obtaining the cellular structure thermal insulation material (hardened mineral foam) of the invention.

The mineral foam of the invention used for making the cellular structure thermal insulation material described hereabove may have the following characteristics, either alone or in combination:

it comprises:
at least one hydraulic binder AHB such as described hereabove optionally containing calcium sulfate, and/or optionally containing Portland cement,
at least one filler, preferably fines,
at least one aqueous and/or non aqueous solvent and
at least one gas such as air, carbon dioxide or nitrogen.

The invention further relates to a hollow filler-containing cement slurry which acts as a precursor for obtaining the cellular structure thermal insulation material (hardened mineral foam) of the invention.

The hollow filler-containing cement slurry of the invention used for making the cellular structure thermal insulation material described hereabove may have the following characteristics, either alone or in combination:

it comprises:
at least one hydraulic binder AHB optionally containing calcium sulfate, and/or optionally containing Portland cement,
at least one low density hollow filler,
at least one aqueous and/or non aqueous solvent.

In the cement slurries or the mineral foams of the invention, the low density hollow filler is introduced in amounts ranging from 1 to 80%, preferably from 1 to 60%, advantageously from 1 to 40% most preferably from 5 to 30% by weight as compared to the dry matter total weight in the cement slurry or in the mineral foam.

The compositions of mineral foam and cement slurry used for implementing the present invention advantageously comprise:

An aluminous hydraulic binder such as defined hereabove.

Preferably the binder comprises from 10 to 90% by weight, as related to the binder total weight, of calcium sulfate.

Advantageously, these mineral foam or cement slurry compositions contain in addition at least one filler selected from reactive fillers. They may also contain low-density hollow fillers.

As used herein, a reactive filler is intended to mean a filler, which takes part to the hydration reaction of the hydraulic binder. According to the present invention, the category of materials called "reactive fillers" does neither include Portland cement nor calcium silicate.

Preferably, the mineral foam or cement slurry composition comprises, for making the hardened mineral foam material of the invention, from 1 to 30% by weight, preferably from 1.5 to 15%, advantageously from 2 to 10%, this percentage being related to the dry matter total weight in the mineral foam, of at least one filler selected from reactive fillers.

Advantageously, the mineral foam or cement slurry composition comprises, for making the hardened mineral foam material of the invention from 0.5 to 5%, by weight as compared to the mineral foam composition total weight of at least one reactive filler activating compound.

As used herein, a reactive filler activating compound is intended to mean a compound selected from alkaline and alkaline earth metal salts, especially alkaline and alkaline earth metal carbonates and sulfates. In addition to the reactive fillers and low density hollow fillers that are mentioned hereabove, the mineral foam composition of the invention may contain chemically inert fillers or fines. They represent advantageously from 10 to 70% by weight of the mineral foam or cement slurry dry matter weight.

In particular embodiments, the binder may also optionally contain, as related to the binder total weight from 0 to less than 5% of Portland cement.

Calcium silicate is one of the components of Portland cement, and traditionally represents from 40 to 60% of Portland cement by weight of the composition.

Advantageously, the binders of the invention may contain from 0 to less than 3%, most preferably to less than 2%, by weight of alkaline or alkaline earth metal silicate, this component being employed alone or being incorporated as a contribution of Portland cement.

They may contain from 0 to less than 5% by weight of calcium hydroxide and calcium oxide, in cumulated % by weight for both materials, as related to the mineral foam or cement slurry weight.

Suitable reactive fillers or fines (fillers which particle size by convention is of less than 100 µm) to be used in the binders of the invention include especially: silica fume, blast furnace slag, steel slag, fly ash, metakaolins, silicas including pyrogenated and precipitated silicas, silicas recovered in rice husks, diatomaceous silicas, alumina under its various forms (hydrated or not), alumina hollow beads, calcinated, standard or expanded clays, silica aerogels, pozzolans. Amongst the chemical materials which may be used in the present invention as a reactive filler, some exist in various particle sizes. Amongst the existing particle sizes for these materials, some correspond to a chemically inert structure. The use of reactive fillers in the present invention is intended as being related to a material in a form which actually enables this material to take part to the hydration reaction of the hydraulic binder. When present, Portland cement does not come into the category of reactive fillers.

Preferably the reactive fillers used in the invention have a median diameter $D_{50}$ lower than or equal to 30 µm, advantageously lower than or equal to 15 µm.

Preferably the reactive fillers used in the invention have a median diameter $D_{90}$ lower than or equal to 80 µm, advantageously lower than or equal to 35 µm.

As used herein a median diameter $D_x$ lower than or equal to y µm is intended to mean that x % of the particles have a diameter lower than y µm. The measure is effected using a laser granulometer of the Malvern type.

Non reactive fillers or fines (fillers which particle size by convention is of less than 100 µm) are typically selected from limestone fillers, particulate silica, calcium carbonates, barium sulfate, titanium, iron, zinc, chromium, zirconia, magnesium metal oxides, boron nitride, lithopone, barium metaborate, perlite, vermiculite, pumices, rhyolite, chamotte, talc, mica, optionally hollow, glass beads or expanded glass granules, silicate foam grains, sands, broken gravels, gravels, pebbles, carbonate black, silicon carbide, corundum, rubber granules, wood, straw.

The mineral foam or slurry composition comprising hollow fillers is further characterized in that:
- it may further comprise preferably a compound selected from surfactants, air-entraining agents and/or gas-generating agents
- it has a workability which may be adjusted to 5-30 minutes or a workability longer than 30 minutes,
  the solvent(s) represent(s) from 10 to 40% by weight of the mineral foam total weight, preferably from 20 to 30% by weight,
- it may further comprise one or more additives selected from foaming agents and stabilizers or foam crosslinking agents, setting accelerators, setting retarders, rheology modifiers and water retaining agents, dispersants and superplasticizers
- it may further comprise other additives selected from waterproofing agents, fibers, thermoplastic or thermosetting polymers.

A suitable mineral foam composition according to the invention has advantageously the following composition, by weight as compared to the mineral foam total weight:
- from 50 to 80%, preferably from 60 to 70% of hydraulic binder AHB10, for 40%, preferably from 20 to 30% of solvent,
- from 2 to 10%, preferably from 2 to 5% of fines, and optionally
- from 0.1 to 15%, preferably from 3 to 10% of an additive selected from foaming agents and stabilizers or foam crosslinking agents, setting accelerators, setting retarders, rheology modifiers and water retaining agents, dispersants and superplastifiants
  amongst which, especially:
  from 0.1 to 2% of a foaming agent,
  from 0.1 to 2% of a crosslinking agent,
  from 0.1 to 2% of a dispersant,
  from 0.1 to 10% of setting accelerators or retarders.

The invention further relates to a method for making a mineral foam such as described above. The methods and devices for making foams are known and described for example in the patents US2005/0,126,781 and U.S. Pat. No. 4,731,389.

The method of the invention comprises the following steps, consisting in:
a) preparing an aqueous foam from a composition comprising at least water and at least one compound selected from foaming agents, air-entraining agents and gas-generating agents,
b) preparing a cement slurry comprising
mixing the binder with a solvent and optionally at least one compound selected from surfactants, air-entraining agents and gas-generating agents,
c) introducing one or more filler(s) for all or part of them into the aqueous foam and/or cement slurry,
d) mixing the aqueous foam and the slurry together.

According to another embodiment, the mineral foam may be prepared according to a preparation method comprising the following steps, consisting in:
a) preparing a cement slurry comprising:
mixing the binder together with a solvent and optionally at least one compound selected from surfactants, air-entraining agents and gas-generating agents,
b) injecting a gas into the slurry while maximizing the contact surface between the gas and the cement slurry,
c) incorporating one or more fillers for all or part of them during or after the step a), or during or after the step b).

According to another embodiment, the hollow filler-containing cement slurry of the invention may be prepared according to a preparation method comprising the following steps, consisting in:
a) preparing a cement slurry comprising:
mixing the binder AHB together with a solvent,
b) incorporating into the slurry at least one low density hollow filler,
c) incorporating one or more fillers for all or part of them during or after the step a), or during or after the step b).

When used in the preparation of the hollow filler-containing mineral foams or cement slurries of the invention, the reactive filler activating compound may be introduced into the cement slurry or with the fillers.

In all three embodiments described hereabove, the additives, such as setting activators and so on, may be introduced for all or part of them into the slurry or into the foam or after having combined the foam and the slurry.

The maximization of the contact surface between the gas and the cement slurry may be obtained, for example by using a static mixer. Moreover, introducing for all or part of them the filler into the slurry at the same time as the gas increases the contact surface between the gas and the slurry.

According to another embodiment, the mineral foam may be generated without adding surfactants through simple air entrainment when preparing a cement slurry comprising a hydraulic binder AHB, optionally containing calcium sulfate, a solvent, and optionally fillers, which may be introduced for all or part thereof either when preparing the slurry, or after this step.

Finally, the invention relates to the use of the mineral foam or hardened mineral foam as a cellular structure thermal insulation material for making thermal insulating materials:
for making precast panels comprising at least one insulating layer based on mineral foam or hardened mineral foam,
for filling hollow parts in building elements for facilities by placing in situ said mineral foam such as walls, ceilings, hollow blocks, doors, ducts,
for making hot floors by placing in situ the foam in contact with the under-surfaces of pipes,
for applying outdoors a monolayer having an insulation function for facing a building by placing in situ said mineral foam.

When the hardened mineral foam is used for preparing materials dedicated to these applications (thermal insulation), a coefficient of thermal conductivity at 20° C. lower than or equal to 0.045 W/m·° C. is particularly advantageous.

The invention further relates to the use of the mineral foam or hardened mineral foam in applications for insulating refractories:
   for making refractory bricks,
   for making monolithic concretes by placing in situ said mineral foam.

When the mineral foam or hardened mineral foam is used for preparing materials dedicated to applications for insulating refractories, the structure is typically reinforced through the use of light fillers previously mentioned in order to limit the shrinkage after burning and to increase the mechanical strength.

Moreover a coefficient of thermal conductivity at 20° C. lower than or equal to 0.2 W/m° C. and preferably lower than or equal to 0.15 W/m° C. is sufficient in this application.

Preferably, the binder of the invention is an ettringite binder. As used herein, an ettringite binder is intended to mean a hydraulic binder which components, upon hydration under normal conditions of use, give ettringite as the main hydrate, which is a trisulfocalcium aluminate having the formula $3CaO,Al_2O_3.3CaSO_4.32H_2O$. Calcium sulfate-containing binders AHB through hydration lead to the formation of ettringite. For this reason, the hydraulic binder AHB of the invention comprises, preferably from 10 to 90% by weight of calcium sulfate as related to the hydraulic binder total weight, preferably from 10 to 70%, even more preferably from 10 to 50%, and most preferably from 20 to 40%.

Calcium sulfate originates from compounds of natural or synthetic origin, or from the treatment of by-products selected from anhydrites, semi-hydrates, gypsums and combinations thereof. The use of a hydraulic binder AHB comprising highly reactive materials enables to obtain mineral foams, cement slurries and thermal insulation materials having very low binder ratios, for example lower than 20%, preferably lower than 10%, or even of 4% by weight as compared to the composition total weight.

Depending on the applications, the cellular structure thermal insulation materials of the invention preferably comprise at most 70% by weight of fillers, even more preferably at most 60% of fillers.

Thus, the hydraulic binders of the invention may predominantly comprise an aluminous cement and (or) a calcium sulfoaluminate cement. However, they may comprise Portland cement as a minor component, preferably in a maximal amount of 5% by weight as related to the hydraulic binder total weight.

The materials of the invention also have outstanding properties of fire resistance. It can be observed that this property is more pronounced when using an ettringite binder thanks to the great amount of bound water present in the ettringite molecular structure.

Preferably, the hydraulic binder of the invention comprises setting-time controlling additives such as setting accelerators or setting retarders. They represent from 0.1 to 15% by weight, preferably from 0.1 to 10% by weight as related to the hydraulic binder total weight.

The setting accelerators used in the present invention may be of any type known. Their use enables to adjust the workability of the mineral foam or of the cement slurry. To be mentioned as illustrative examples are sodium aluminate, sodium silicate, potassium aluminate, aluminium sulfate, potassium carbonate, lithium salts such as lithium hydroxide, lithium sulfate and lithium carbonate to be used alone or in combination.

The setting retarders used in the present invention may be of any type known, and to be especially mentioned as illustrative examples are citric acid, tartaric acid, gluconate, and boric acid and salts thereof to be used alone or in combination.

Water retaining agents and rheology modifiers may be selected in the family including cellulose ethers, guar ethers, starch ethers, associative polymers, polymers obtained through biofermentation such as xanthan gums, wellan gums . . . .

In order to limit the moisture transfers inside the hardened mineral foam, which significantly increase the coefficient of thermal conductivity and therefore significantly reduce the thermal insulation efficiency, it is interesting to incorporate a waterproofing agent introduced for all or part of it either into the mineral foam or into the cement slurry mass during the preparation thereof, or through impregnation of the hardened mineral foam. To be mentioned as illustrative, non limitative examples of suitable waterproofing agents are:
   silicon oils of the polydimethylsiloxane type which may be functionalized or not with reactive groups of the Si—H, Si(OMe), Si(OEt) type, the aqueous emulsions derived from these oils such as for example described in the U.S. Pat. No. 5,373,079;
   organosilanes such as trialkoxysilanes and silazanes described in the patent US 2,005, 018,217,4;
   siliconates such as for example potassium methylsiliconate;
   paraffins, waxes of the stearate and oleate types, vegetable oils and their derivatives such as marketed by the Novance company.

These waterproofing agents will be used depending on their nature, either neat or diluted in a solvent, or dispersed or emulsioned in water.

In order to reinforce the mechanical properties of the hardened mineral foam, it is interesting to introduce polymers during the preparation of the mineral foam or of the cement slurry such as for example polyvinyl alcohols, polyamides, latexes in a liquid form or in a powdered form.

As used herein, a latex is intended to mean an emulsion of one or more polymers obtained through radical polymerization of ethylenically unsaturated monomers selected from styrene, styrene derivatives, ethylene, vinyl acetate, vinyl chloride, vinylidene chloride, vinyl propionate, vinyl n-butyrate, vinyl laurate, vinyl pivalate and vinyl stearate, VEOVA° 9 to 11, (meth)acrylamide, (C1-C20)alkyl esters of methacrylic acid, (C2-C20)alkenyl esters of methacrylic acid with alkanols of from 1 to 12 carbon atoms, such as methylester, ethylester, n-butylester, isobutylester, t-butylester and 2-ethylhexylester of acrylic and methacrylic acids, nitriles, acrylonitriles, dienes, such as 1,3-butadiene, isoprene, monomers carrying two vinyl groups, two vinylidene groups or two alkylene groups.

It can also be envisaged to introduce some thermosetting or photo-crosslinkable polymers, for all or part thereof, either during the preparation of the mineral foam or of the cement slurry, or by spraying or impregnating onto the hardened mineral foam.

Suitable examples of thermosetting polymers (which do crosslink under the action of heat or a radiation) include as non limitative examples polyurethanes, epoxies and polyesters.

The fillers used in the invention are typically inert materials used as a filling agent. In an especially advantageous embodiment, it is envisaged to use reactive fillers in the mineral foam. In another advantageous alternative it is envisaged to use low-density hollow fillers in the mineral foam or in the cement slurry. The fillers may be mineral or organic in nature. The mineral fillers may be for example selected from silica fume, blast furnace slag, steel slag, fly ash, limestone fillers, particulate silica, silicas which pyrogenated and precipitated silicas, silicas recovered in rice husks, diatomaceous silicas, calcium carbonates, barium sulfate, metakaolins, titanium, iron, zinc, chromium, zirconium, magnesium metal oxides, alumina under its various forms (hydrated or not), alumina hollow beads, boron nitride, lithopone, barium metaborate, calcinated, standard or expanded clays, perlite, vermiculite, pumices, rhyolite, chamotte, talc, mica, optionally hollow, glass beads or expanded glass granules, silica aerogels, silicate foam grains, sands, broken gravels, gravels and/or pebbles. The organic fillers may be selected in the group made of organic polymer beads (polytetrafluoroethylene, polyethylene, polypropylene, polystyrene, polyvinyl chloride, polydimethylsiloxane), rubber granules, wood such as cork powder, filler wood, straw and/or polystyrene flakes.

Low-density hollow fillers are preferably used. Preferably, the fillers have a lower density as that of fresh mortar (which is of less than 3). Typically the low density hollow fillers have a density of less than 0.5, preferably of less than 0.1, advantageously of less than 0.05. The hollow filler size is preferably ranging from 10 μm to 2.5 mm. Hydrophobic fillers, for example of calcium carbonate, are preferably used. The fine fillers, that is to say fillers having a mean diameter D90 lower than or equal to 5 μm, preferably lower than 1 μm reinforce the mineral foam. Preferably, the material of the invention comprises fillers of mean diameter (D90) lower than or equal to 5 μm.

To be mentioned as foam glass granules are the granules marketed under trademark Poraver® having a bulk density as a function of the particle size ranging from 140 to 530 Kg/m$^3$. For example, granules with a standard particle size of 4-8 mm have a bulk density of 180 kg/m$^3$ and granules with a particle size of 0.1-0.3 mm have a density of 400 kg/m$^3$. To be mentioned are also the foam glass granules Liaver, the particle size of which does range from 0.25 to 4 mm as well as grains with a higher particle size (0-72 mm) marketed under the trade name Misapor®.

To be mentioned as hollow glass beads are the glass beads marketed by the 3M, Potters PQ and Akzo Nobel Expancel companies, with a particle size ranging from 20 μm to 110 μm and a density of about 100 kg/m$^3$.

To be used as cenospheres are the products marketed by the Trelleborg Fillite, Potters PQ, Omega Minerals companies. These fillers are cenospheres with a particle size of 0-0.5 mm, the bulk density of which does range from 350 to 450 kg/m$^3$.

To be mentioned as silicate foam grains are the grains SLS®20 which are very lightweight grains, hydrophobic in nature.

To be used as expanded clays are for example those with a particle size of 0-4 mm and having a bulk density of about 200 kg/m$^3$.

The pumices or pumice stones are highly porous volcanic rocks with a low density often of less than 1. Preferably, pumices have a particle size ranging from 0.3 to 8 mm. This product is marketed by the Quick Mix company.

Expanded clays used according to the invention preferably have a particle size ranging from 1 to 8 mm and a bulk density ranging from 280 to 650 kg/m$^3$. These products are marketed by the Maxit Fibo and Liapor companies. Surface-treated expanded clays may be chosen for reducing water demand.

The expanded shales used according to the invention preferably have a particle size ranging from 2 to 8 mm. These products are marketed by the Berwilit company. Perlite used according to the invention preferably has a particle size ranging from 0 to 6 mm and a bulk density ranging from 39 to 95 kg/m$^3$. This product is marketed for example by the Knauf and Pavatex companies.

Vermiculite used according to the invention preferably has a particle size ranging from 0 to 2 mm and a bulk density ranging from 60 to 160 kg/m$^3$. This product is marketed for example by the Isola-Mineralwolle Werke, CMMP and Reppel companies.

Rhyolite used according to the invention preferably has a particle size ranging from 10 to 350 μm and a bulk density ranging from 180 to 350 kg/m$^3$. This product is marketed for example by the Lafarge Noblite company.

Other types of additives may also be used, such as for example water retaining agents and rheology modifiers which may be selected from the family of cellulose ethers, guar ethers, starch ethers, polyvinyl alcohols, polyacrylamides, associative polymers, polymers obtained through biofermentation such as xanthan gums, wellan gums, pyrogene silicas, precipitated silicas, laponites, bentonites, hectorites . . . .

Dispersants may also be used, such as for example lignosulfonates, naphthalene sulfonates, melamine sulfonates, caseins, modified polycarboxylates, polymers comprising phosphonate units, phosphates and phosphonates.

The mineral foam or the hollow filler-containing cement slurry are obtained from a cement slurry. The cement slurry may be prepared extemporaneously, that is to say just before use. In this case, the hydraulic binder components may firstly be mixed together with the setting-time controlling agents and optionally the fillers and/or other additives so as to form a powdered mixture, then the thus obtained mixture be mixed with water or a solvent to form a cement slurry.

It is also possible to employ a ready-to-use aqueous slurry, that is to say a slurry that has been prepared beforehand. In this case, the slurry should be stabilized to exhibit a high life-time, that is to say of at least one month, even more preferably of two months, preferably 3 months or more, and even more preferably of at least 6 months, in order to saveguard storage life or delivery times.

As used herein, the "life-time" is intended to mean the time during which a component remains in the form of an aqueous or non aqueous suspension of solid products, more or less fluid, that is able to return to the aqueous or non aqueous suspension state through a simple mechanical stirring, without setting.

The slurry in aqueous phase should be stabilized (or retarded) for several months. Boric acid or one salt thereof suspended in water may be used to that end for example. It will therefore be required for initiating the setting to "release" the cement contained in the slurry before use. To that purpose, a material is typically used, that is able to "release" the retarded aluminous cement and optionally a catalyst enabling to accelerate the setting of the cement, for example, a mixture of lime and lithium hydroxide. The patents EP 0241 230 and EP 0 113 593 disclose systems of this type.

To obtain the mineral foam of the invention, the cement slurry described hereabove may be combined with an aqueous foam comprising at least one compound selected from foaming agents, air-entraining agents and gas-generating agents. An instrumentation can be used, such as illustrated on FIG. 1 for preparing the aqueous foam. A mixture of water and foaming agents or air-entraining agents 1 is pumped by means of a metering pump 2 and is co-injected with a gas 3 in a mixing device 5 for example a static mixer (or a tube filled with beads). The gas, for example air, nitrogen or carbon dioxide is collected from a gas source 3. The injected gas flow rate is monitored using a flowmeter 4. According to another embodiment, the mixture of gas and water, of foaming agents and/or air-entraining agents flows through several bead stirrers 5 and 6 having beads of continuously decreasing diameters. Finally the aqueous foam is recovered in a container 7.

According to another embodiment of the invention, to the cement slurry is directly added at least one compound selected from foaming agents, air-entraining agents and gas-generating agents, then a gas is injected into this slurry so as to form the mineral foam. The gas injection is effected by maximizing the interaction surface between the gas and the slurry so as to obtain a plentiful and stable mineral foam. An instrumentation may be used such as that described on FIG. 1 by replacing the combination of water and foaming agents or air-entraining agents by the additived cement slurry.

According to another embodiment, the mineral foam may be generated without adding surfactants by air entrainment when preparing a cement slurry comprising a hydraulic binder AHB, a solvent, fillers, preferably reactive fillers or low-density hollow fillers, or for example fillers, which may be introduced for all or part thereof either when preparing the slurry, or after this step.

According to another embodiment, hollow fillers are incorporated into the cement slurry so as to generate pores.

The mineral foam or the cement slurry thus obtained may be directly used for making a cellular structure thermal insulation material (or hardened mineral foam) of the invention. The mineral foam or the cement slurry or the hardened mineral foam of the invention advantageously does not require any chemical treatment, especially any expensive hydrothermal treatment. The cellular structure thermal insulation material of the invention may therefore be obtained without any chemical or hydrothermal treatment.

According to the invention, any foaming agent traditionally used for foaming cement can be suitably used, such as anionic, non ionic surfactants and combinations thereof. An additive for stabilizing the aqueous foam may optionally be added. The stabilizing additives may be either surfactants, or polymers, long-chain alcohols, in a liquid form or as solid particles such as for example alkanolamides, hydrocolloids, proteins mentioned in the patents WO/2008/020246, WO/2006/067064, and U.S. Pat. No. 4,218,490. The foam of the invention may not comprise any foaming agent or foam stabilizer.

The air-entraining agents are compounds which make it possible to stabilize the air bubbles entrapped by the turbulences resulting from stirring. To be mentioned as air-entraining agents are wood natural resins, sulfate or sulfonate compounds, synthetic detergents and organic fatty acids.

The gas-generating agents used according to the invention may for example be selected from compounds producing nitrogen, oxygen, hydrogen, carbon dioxide, carbon monoxide, ammoniac or methane. The patent US 2005/0,126,781 mentions a plurality of gas-generating agents, which can be used according to the invention. To be mentioned as illustrative examples are compounds containing hydrazine or azo groups such as hydrazine, azodicarbonamide, azobis (isobutyronitrile), p-toluenesulfonyl hydrazide, p-toluenesulfonyl semicarbazide, carbohydrazide, p-p'-oxybis (benzenesulfonyl hydrazide) and combinations thereof. Examples of nitrogen-producing agents which do not contain any hydrazine or azo group include organic or inorganic acid ammonium salts, hydroxylamine sulfate, carbamides and combinations thereof, Examples of oxygen-producing agents are for example the bleaching agents that are traditionally used in detergent field, such as for example peroxides, percarbonates, persulfates, peroxycarbonates. The material (hardened mineral foam) or the mineral foam or the hollow filler-containing cement slurry of the invention are particularly useful for improving the thermal insulation and the fire resistance in facilities. Indeed, the material (hardened mineral foam) or the mineral foam or the cement slurry may be used for making precast panels comprising at least one insulating layer based on that material (hardened mineral foam) such as:

for making panels for replacing polystyrene panels used in thermal insulation systems from the outside, for making sandwich panels, wherein the mineral foam, or the hollow filler-containing cement slurry, is introduced between two walls of building material (wood, plywood, polystyrene, plaster, concrete), for making load-bearing or not, insulating pre-walls, or hollow blocks and bricks to be used for construction, for making panels for replacing composite slab panels with glass fibers or PU inside, used for the inner thermal insulation of a house.

The material (hardened mineral foam) or the mineral foam or the hollow filler-containing cement slurry may also be used for placing in situ the mineral foam for filling hollow parts in building elements for facilities, such as walls, ceilings, hollow blocks, doors, ducts . . . .

The material or the mineral foam may also be used for placing in situ the mineral foam as under-surface in contact with the pipes for hot floors.

The material or the mineral foam or the hollow filler-containing cement slurry may also be used for applying in situ the mineral foam on the outside, as a monolayer having an insulating function for rendering buildings, where such monolayer may be covered with an aesthetic finishing coat.

The material, or the mineral foam of the invention, or the hollow filler-containing cement slurry is also especially useful for making insulating concretes or bricks for refractory applications including the production of refractory bricks and the placing in situ of the mineral foam for making monolithic concretes.

Finally, the mineral foam or the hollow filler-containing cement slurry of the invention may be used as a ready-to-use concrete from which to obtain a thermo-insulating material used in following applications:

structures, studs, cross walls and slabs in Monowall elements thus enabling to reduce thermal bridges at the junctions, outer concrete shells enabling the reduction of thermal bridges between the various floors of a building, slabs on earth platforms, filling of double-walls, roof and terrace insulation.

EXAMPLES

I—Definition of Protocols

I.1—Determination of Thermal Conductivity and Thermal Shrinkage

Measurement of the thermal conductivity, λ at 20° C.
Thermal conductivity values have been measured according to the standard EN 12667:2001 "Thermal performance of building materials and products. Determination of thermal resistance by means of guarded hot plates and heat flow meter methods. Products of high and medium thermal resistance".

I.2—Determination of Compressive Strength

The compressive strength was determined according to the standard EN 196-1 with concrete cubes of 100×100×100 mm after 3 and 24 hours.

I.3—Determination of the Apparent Porosity of a Concrete According to the Standard: EN 993-1

I.3.1—Instrumentation

Weighing scale 0.1 g fitted with a fastening device for the basket receiving the sample
Vacuum bell
Vacuum pump with pressure gauge
Water jar at 20° C.
Pail of water at 20° C.

I.3.2—Procedure

Dry the sample in oven at 60° C. (civil engineering) or at 110° C. (refractory) for 24 h
Weigh the dry sample (P1)
Introduce the sample in the vacuum bell
Create vacuum and control pressure gauge (<50 mBar)
While maintaining suction, slowly introduce water in the vacuum bell until covering the sample with 2 cm water (submerge the sample under vacuum)
Maintain suction to the end of water ebullition (=>to remove air from the pores)
Shut the valve of the vacuum bell off and turn the pump off
Allow impregnation under vacuum to proceed for a minimum of 3 hours (degassing time of the sample)
Bring the bell back to atmospheric pressure
Remove the sample to test and remove excess water with a damp sponge (do not dry the sample)
Weigh the water-saturated sample (P2)
Tare the weighing scale with the water-saturated sample on the plate
Introduce the sample in the metallic basket suspended under the weighing scale
Immerge the whole in a pail under approximately 10 cm water
Read the weight (P3), which enables to measure the water weight displacement and therefore the volume of the sample (buoyancy measurement on the water-saturated specimen)

POROSITY (%)=(Water-saturated weight−Dry weight)/Volume×100

POROSITY (%)=$(P2-P1)/P3*100$

I-4: Determination of True Density and Apparent Porosity by the Pycnometer Method

I-4-1: Instrumentation

Pycnometer Micromeritics ACCUPYC II 1340.
Precision weighing scale of the Mettler type +/−0.0001 g.
Bottle+pressure regulator helium (99.995% mini) 1.5 bars (21.5 psi)

I-4-2: Range of Validity-Accuracy

Measuring range: >0.2 g/cm$^3$
Measurement accuracy: 0.05%

I-4-3: Procedure

Preparation of Samples:
The sample should be placed in an oven at 60° C. (mini 2 h), then cooled down so as to remove water and stabilize more rapidly the measure (5 identical successive measurements).
Tare the sample supporting cell and fill the same to ⅔. Save the exact mass. Introduce the cell in the pycnometer and close the cover.
Initiate the measurement cycle through the computer program.
Results:
Determination of true density of a solid (g/cm$^3$) based on the measurement of the volume occupied by a known mass of material present in the cell.
The result corresponds to the average of the five last results within the device confidence interval (0.02% in volume variation).
The computerized results to within 0.01 g/cm$^3$ express the value.

POROSITY (%)=1−(1/bulk density measured−1/true density)×100

I-5: Measurement of Pore Diameters Through Optical Microscopy

The hardened mineral foam is impregnated with a hardenable resin (epoxy resin) to be observable under optical microscopy. After 12 h hardening, the sample is cut out transversally to plates of about 4 cm*4 cm, with a thickness ranging from 0.05 to 3 mm. The observation of the sample transversal surface is effected under magnification ×5.

II—Examples of Compositions of the Invention and Evaluation of the Thermal Conductivity and Compressive Strength of Insulation Materials of the Invention

II. A. Example 1

II. A. 1—Preparation of Binders

Following components were added to a container:

| Component | Binder of the invention L1 |
|---|---|
| Hydraulic binder: | |
| Calcium aluminate from the TMC company | 70 g |
| Gypsum | 30 g |

-continued

| Component | Binder of the invention L1 |
|---|---|
| Lithium carbonate | 0.05 g* |
| Citric acid | 0.18 g* |
| Dispersant: | |
| Mighty 21 PZ ® (Polycarboxylate ether powdered) | 0.22 g |
| Cellulose ether | 0.1 g |
| Microfibers of cellulose: | |
| Arbocel ® 40 (CFF) length 0.45-1 µm. | 0.5 g |
| Filler: | |
| silica fume Rw Q1 Fuller | 5 g |
| Water: | 22.5 g |
| Crosslinking agent: | |
| LithoFoam ® NWFS | 1.5 g |

The components are mixed using an electric mixer for 30 seconds at low speed (graduation 1), then for 1 minute and 30 seconds at high speed (graduation 5). A cement slurry is thus obtained.

II. A. 2—Production of the Aqueous Foam

Mix in a bowl following products:
6 g of a foaming agent Lithofoam® SL400-L (protein of 20000 to 120000 Daltons),
0.40 g of cellulose ether,
80 g of water.
The whole is mixed with the electric mixer at high speed for 5 minutes until a homogeneous and compact aqueous foam is produced.

II. A. 3—Preparation of the Mineral Foam 20 grams of the aqueous foam are incorporated into the cement slurry prepared hereabove by means of the electric mixer for 3 minutes at medium speed (graduation 3).

II. A. 4—Pouring and Drying of the Mineral Foam

The mineral foam is poured into molds of 4 cm*4 cm*16 cm previously lubricated with a mold oil.

II. A. 5—Mineral Foam Composition

| Composition | Amounts (parts by weight) | % (by weight) |
|---|---|---|
| Binder | 94.5 | 66.8% |
| Water | 38.6 (21.2 + 17.4) | 27.3% |
| Foaming agent | 1.3 | 0.9% |
| Crosslinking agent | 1.4 | 1% |
| Fillers | 5.2 | 3.7% |
| Other additives | 0.4 (0.3 + 0.1) | 0.3% |

II. A. 6—Characterization of the Insulating Material Obtained

Density: 125 Kg/m³.
Compressive strength at 3 hours: Cs=0.3 MPa
Coefficient of thermal conductivity: λ=0.044 W/m·° C.
No default due to Ostwald ripening
Porosity>90%.

II. B. Example 2

Comparison Between the Insulating Material of the Invention and an Insulating Material Based on Portland Cement 52.5 R II B. 1—Preparation of Binders Following components were added to a container:

| Component | Binder of the invention L2 | Comparative Binder 1 LC1 | Comparative Binder 2 LC2 |
|---|---|---|---|
| Hydraulic binder: | | | |
| Portland cement 52.5R (Lafarge Le Havre) | 4.76 g | 100 g | 100 g |
| Calcium aluminate Ternal RG ® (Kerneos) | 66.67 g | — | — |
| Anhydrite | 28.7 g | — | — |
| Lithium carbonate | 0.05 g | — | — |
| Sodium carbonate | — | — | 0.4 g |
| Citric acid | 0.18 g | — | — |
| Dispersant: | | | |
| Mighty ® 21 PZ (Polycarboxylate ether powdered) | 0.2 g | 0.2 g | 0.2 g |
| Microfibers of cellulose: | | | |
| Arbocel ® 40 (CFF) length 0.45-1 µm | 0.2 g | 0.2 g | 0.2 g |
| Fillers: | | | |
| silica fume Rw Q1 Fuller | 5 g | 5 g | 5 g |
| Water: | 22.5 g | 22.5 g | 22.5 g |
| Foam curing agent: | | | |
| Lithofoam ® NWFS (solution ≈30% dry matter) | 1.5 g | 1.5 g | 1.5 g |

The components are mixed using an electric mixer for 30 seconds at low speed (graduation 1), then for 1 minute and 30 seconds at high speed (graduation 5).

II. B. 2—Production of the Aqueous Foam

Mix in a bowl following products:
5 g of a foaming agent Lithofoam® SL400-L (protein of 20000 to 120000 Daltons)
80 g of water.
The whole is mixed with the electric mixer at high speed for 5 minutes until a homogeneous and compact aqueous foam is produced.

II. B. 3—Preparation of the Mineral Foam 20 grams of the aqueous foam are incorporated into 100 grams of binder by means of the electric mixer for 3 minutes at medium speed (graduation 3).
The mineral foam of the invention is all the more easy to obtain as the aqueous foam readily incorporates into the binding phase and the whole is homogeneous.
The comparative assay mineral foam 2 was difficult to obtain because the binder was not fluid enough.

II. B. 4—Pouring and Drying of the Mineral Foam

The mineral foam is poured into molds of 4 cm*4 cm*16 cm previously lubricated with a mold oil.

The mineral foams are thereafter dried at 23° C. and 60% RH for 24 h in order to obtain the cellular structure thermo-insulating material of the invention.

It could be observed that the mineral foam predominantly based on Portland cement obtained with the comparative binder LC1 collapsed (FIG. 2b) as opposed to the mineral foam of the invention predominantly based on aluminous cement L2 which did not collapse (FIG. 2a). FIG. 2c) represents the insulating material predominantly based on Portland cement LC2. A lesser collapse could be observed but a high inhomogeneity also within the cellular structure thermo-insulating material obtained.

II. B. 5—Characterization of the Cellular Structure Thermo-Insulating Material of the Invention Measurement of Pore Volume and Density:

The density of the cellular structure thermo-insulating material is measured using a pycnometer, this measure being compared to the result obtained through water porosimetry. Both methods made it possible to measure a density of 0.29 and a pore volume of 85% for the insulating material of the invention comprising an aluminous cement-, calcium sulfate- and Portland cement-based binder.

Measurement of Insulating Material Pore Diameters:

The hardened mineral foam is impregnated with a hardenable resin (epoxy resin) in order to be observable under optical microscopy. After 12 h hardening, the sample is cut out transversally to plates of about 4 cm*4 cm*, with a thickness ranging from 0.05 to 3 mm.

The observation of the sample transversal surface is effected under magnification ×5 and is illustrated on FIGS. 3a) and 3b).

As shown on FIGS. 2a to 2c, the hardened mineral foam of the invention (L2. FIG. 2a) has an outstanding mechanical behavior, whereas the hardened mineral foams only based on Portland cement, (LC1. FIG. 2b and LC2. FIG. 3b) collapsed upon contacting the aqueous foam with the slurry.

The hardened mineral foam of the invention (L2. FIG. 3a) comprises regularly distributed (4 to 5 bubbles per mm$^2$) and regularly sized bubbles, whereas the hardened mineral foam of comparative example LC1 (FIG. 3b) has a heterogeneous bubble size and bubble distribution.

II. C. Example 3

Ettringitic Binders with Hollow Fillers and Comparison with Portland Cement 52.5R-Based Material

II. C. 1—Preparation of Binders

Following components were added to a container:

| Component | Binder of the invention L3 with hollow and reactive fillers | Comparative/ Binder 1 LC3 without hollow fillers | Comparative binder 100% OPC/Binder 1 LC4 |
|---|---|---|---|
| Hydraulic binder: | | | |
| Portland cement 52.5R (Lafarge Le Havre) | 7.15 g | 7.15 g | 100 g |
| Calcium aluminate Secar 51 ® (Kerneos) | 35.75 g | 35.75 g | — |
| Anhydrite | 12.5 g | 12.5 g | — |
| Sodium carbonate | — | — | 0.4 g |
| Citric acid | 0.1 g | 0.1 g | 0.1 g |
| Hollow filler | | | |
| Thermosilit ® (*) | 11.0 g | — | — |
| Reactive fillers: | | | |
| silica fume Rw Q1 Fuller | 5.03 g | 5.03 g | 5.03 g |
| Dispersant: | | | |
| Conpac 500 | 0.36 g | 0.36 g | 0.36 g |
| Cellulose ether: | | | |
| Tylose H300P2 | 0.11 g | 0.11 g | 0.11 g |
| Resin | | | |
| Vinnapass 5011L | 3 g | 3 g | 3 g |
| Fillers: | | | |
| Durcal 2 | 25 g | 25 g | 25 g |
| Sand Palvadeau 0-0.315 mm | — | 11 g | 11 g |
| Water for mixing | 30 g | 22 g | 22 g |

(*) Thermosilit ® is a hollow filler of expanded perlite type which presents the following characteristics:
Particle size: 0-2.5 mm
Density: 80-100 kg/m$^3$ The components are mixed using an electric mixer for 30 seconds at low speed (graduation 1), then for 1 minute and 30 seconds at high speed (graduation 5). A cement slurry is thus obtained.

II. C. 2—Production of the Aqueous Foam

Mix in a bowl following products:
4 g of a foaming agent Empicol ESC/3L (sodium laureth ether sulfate),
0.1 g of xanthan gum,
0.1 g of lithium sulfate,
92.8 g of water.

The whole is mixed with the electric mixer at high speed for 5 minutes until a homogeneous and compact aqueous foam is produced, with a density of 50 kg·m$^3$.

II. C. 3—Preparation of the Mineral Foam 30 grams of aqueous foam are incorporated into 100 g of cement slurry prepared hereabove by means of the electric mixer for 3 minutes at medium speed (graduation 3).

II. C. 4—Pouring and Drying of the Mineral Foam

The mineral foam is poured into molds of 4 cm*4 cm*16 cm or 10 cm*10 cm*10 cm in polystyrene.

The mineral foams are thereafter dried at 23° C. and 60% RH for 24 h in order to obtain the cellular structure thermo-insulating material of the invention.

It could be observed that the mineral foam predominantly based on Portland obtained with the comparative binder LC3 collapsed as opposed to the mineral foam of the invention predominantly based on aluminous cement L3 with reactive fillers and hollow fillers which did not collapse.

II. C. 5—Mineral Foam Composition (Binder L3 with Reactive Fillers and Hollow Fillers)

| Composition | L3% (by weight) |
|---|---|
| Binder | 32.78 |
| Hollow filler | 6.51 |
| Reactive filler | 2.98 |
| Filler | 14.79 |
| Water | 39.75 |
| Foaming agent | 0.30 |
| Other additives | 3.19 |

II. C. 6—Characterization of the Insulating Material Obtained

Density: 194 Kg/m$^3$

Porosity: 91%

Compressive strength at 3 hours: 0.5 MPa, at 24 hours: Cs=0.8 MPa

Coefficient of thermal conductivity: $\lambda$=0.07 W/m·° C.

The comparative assay mineral foam with Portland cement LC4 could not be obtained due to the collapse of the mineral foam. The causes of such collapse result from the low reactivity of this system.

Figure 4:
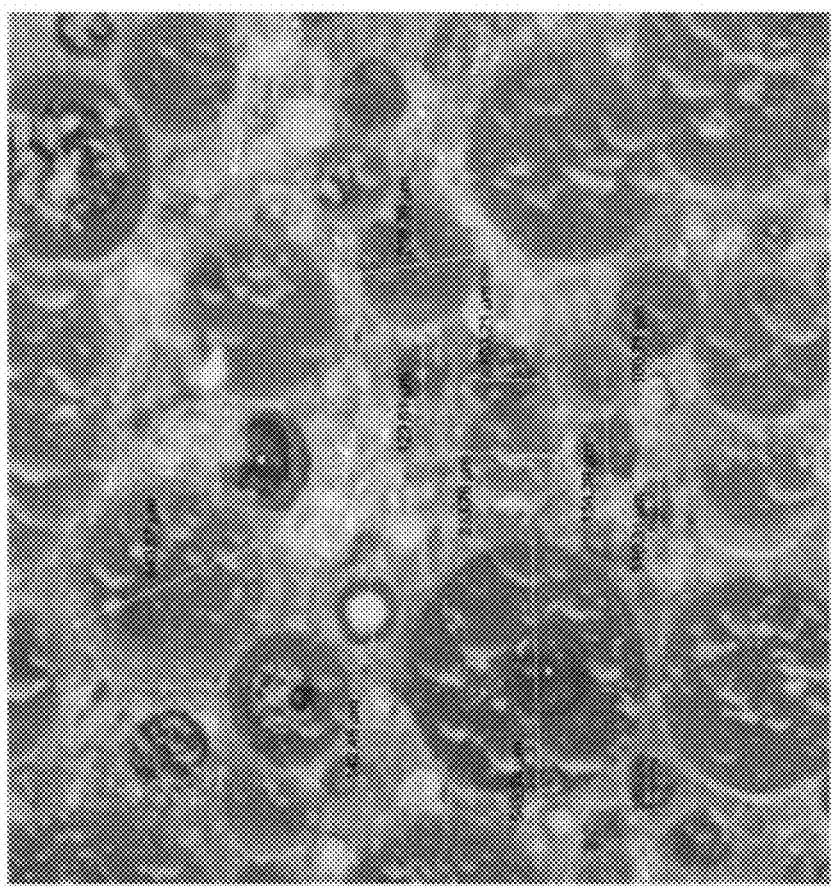
Figure 5:
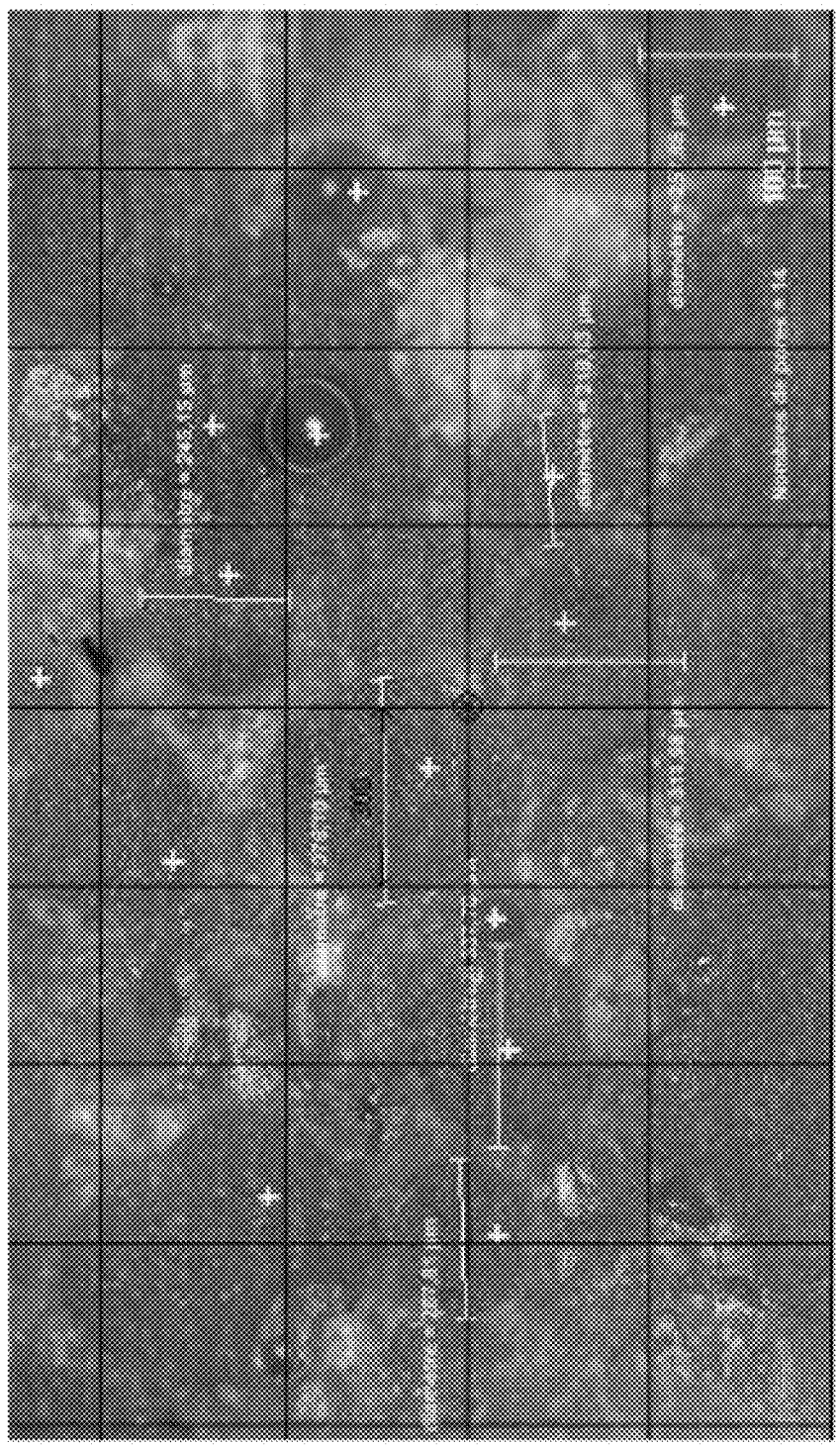

Measurement of the Insulating Material Pore Diameters:

FIG. 4 shows pores which sizes range approximately from 100 to 550 μm.

II. D. Example 4

Low Concentration of Binder, without Ordinary Portland Cement (OPC), with Reactive Fillers and Hollow Fillers

II. D. 1—Preparation of Binders

Following components were added to a container:

| Component | Ettringite binder with hollow and reactive fillers L4 | Comparative binder 100% OPC/Ettringite binder LC5 |
|---|---|---|
| Hydraulic binder: | | |
| Portland cement 52.5R (Lafarge Le Havre) | — | 13.3 g |
| Calcium aluminate Secar 51 ® (Kerneos) | 9.1 g | — |
| Anhydrite Francis Flower | 3.51 g | — |
| Semi-hydrate Prestia Creation | 0.39 g | — |
| Air-slaked lime | 0.3 g | 0.3 g |
| Hollow filler | | |
| Silica aerogel Isogel ® | 5.0 g | 5.0 g |
| Reactive fillers: | | |
| Slag (*) | 5 g | 5 g |
| silica fume Rw Q1 Fuller | 5 g | 5 g |
| Dispersant: | | |
| Compac 500 | 0.36 g | 0.36 g |
| Cellulose ether: | | |
| Tylose MH15003P6 | 0.10 g | 0.11 g |
| Fillers: | | |
| Durcal 130 | 33 g | 25 g |
| Sand Sifraco BR36 | 37.5 g | 11 g |

(*) The characteristics of the slag used in all examples are as follows:
Specific surface (Blaine): 2900 cm$^2$/g
True density: 2.913 g/cm$^3$
Particle size (μm):
D10 3.49
D20 5.60
D50 12.65
D80 24.76
D90 33.22

The components are mixed using an electric mixer for 30 seconds at low speed (graduation 1), thereafter 3 minutes and 30 seconds at high speed (graduation 5). A mineral foam is thus obtained.

II. D. 2—Production of the Aqueous Foam

Mix in a bowl following products:
4 g of a foaming agent Empicol ESC/3L (sodium laureth ether sulfate),
0.1 g of xanthan gum,
0.1 g of lithium sulfate,
92.8 g of water.

The whole is mixed with the electric mixer at high speed for 5 minutes until a homogeneous and compact aqueous foam is produced, with a density of 50 kg·m$^3$.

II. D. 3—Preparation of the Mineral Foam 15 grams of aqueous foam are incorporated into 100 g of cement slurry prepared hereabove by means of the electric mixer for 3 minutes at medium speed (graduation 3).

II D. 4—Mineral Foam Composition

| Composition | % (by weight) |
|---|---|
| Binder L3 | 9.27 |
| Hollow filler | 3.56 |
| Reactive filler | 7.13 |
| Filler | 50.88 |
| Water | 28.12 |
| Foaming agent | 0.52 |
| Other additives | 0.63 |

II. D. 4—Characterization of the Insulating Material Obtained

Density: 232 Kg/m$^3$.

Compressive strength at 3 hours: Cs=0.2 MPa

Coefficient of thermal conductivity: $\lambda$=0.0712 W/m·° C.

Porosity: 86%

The comparative assay mineral foam LC5 with Portland cement could not be obtained due to the collapse of the mineral foam. The causes of such collapse result from the low reactivity of this system.

Measurement of the Insulating Material Pore Diameters:
On FIG. 5, pores with a size of less than 300 µm can be observed

II. E. Example 5

Production of Foam In Situ in the Slurry with Reactive Filler and Hollow Filler

II. E. 1—Preparation of Binders

Following components were added to a container:

| Component | Ettringite binder with hollow and reactive fillers L5 |
|---|---|
| Hydraulic binder: | |
| Portland cement 52.5R (Lafarge Le Havre) | — |
| Calcium aluminate Secar 51 ® (Kerneos) | 7 g |
| Anhydrite Francis Flower | 2.7 g |
| Semi-hydrate Prestia Creation | 0.3 g |
| Air-slaked lime | 0.3 g |
| Hollow filler | |
| Thermosilit ® | 20.0 g |
| Reactive fillers: | |
| Slag (*) | 5 g |
| silica fume Rw Q1 Fuller | 5 g |
| Dispersant: | |
| Conpac 500 | 0.36 g |
| Cellulose ether: | |
| Tylose H300P2 | 0.08 g |
| Fillers: | |
| Durcal 130 | 26 g |
| Sand Sifraco BR36 | 30.5 g |
| Foaming system: | |
| Empicol ESC/3L | 1 g |
| Lithium sulfate | 0.1 g |
| Xanthan gum | 0.015 |
| Water for mixing | 40 g |

(*) cf example 4

The components are mixed using an electric mixer for 30 seconds at low speed (graduation 1), thereafter 3 minutes and 30 seconds at high speed (graduation 5). A mineral foam is thus obtained.

II. E. 2—Pouring and Drying of the Mineral Foam

Same method as II. D. 2.

II. E. 3—Mineral Foam Composition

| Composition | % (by weight) |
|---|---|
| Binder | 7.23 |
| Hollow filler | 14.46 |
| Reactive filler | 7.23 |
| Filler | 40.84 |
| Water | 28.91 |
| Foaming agent | 0.72 |
| Other additives | 0.56 |

II. E. 4—Characterization of the Insulating Material Obtained

Figure 6:
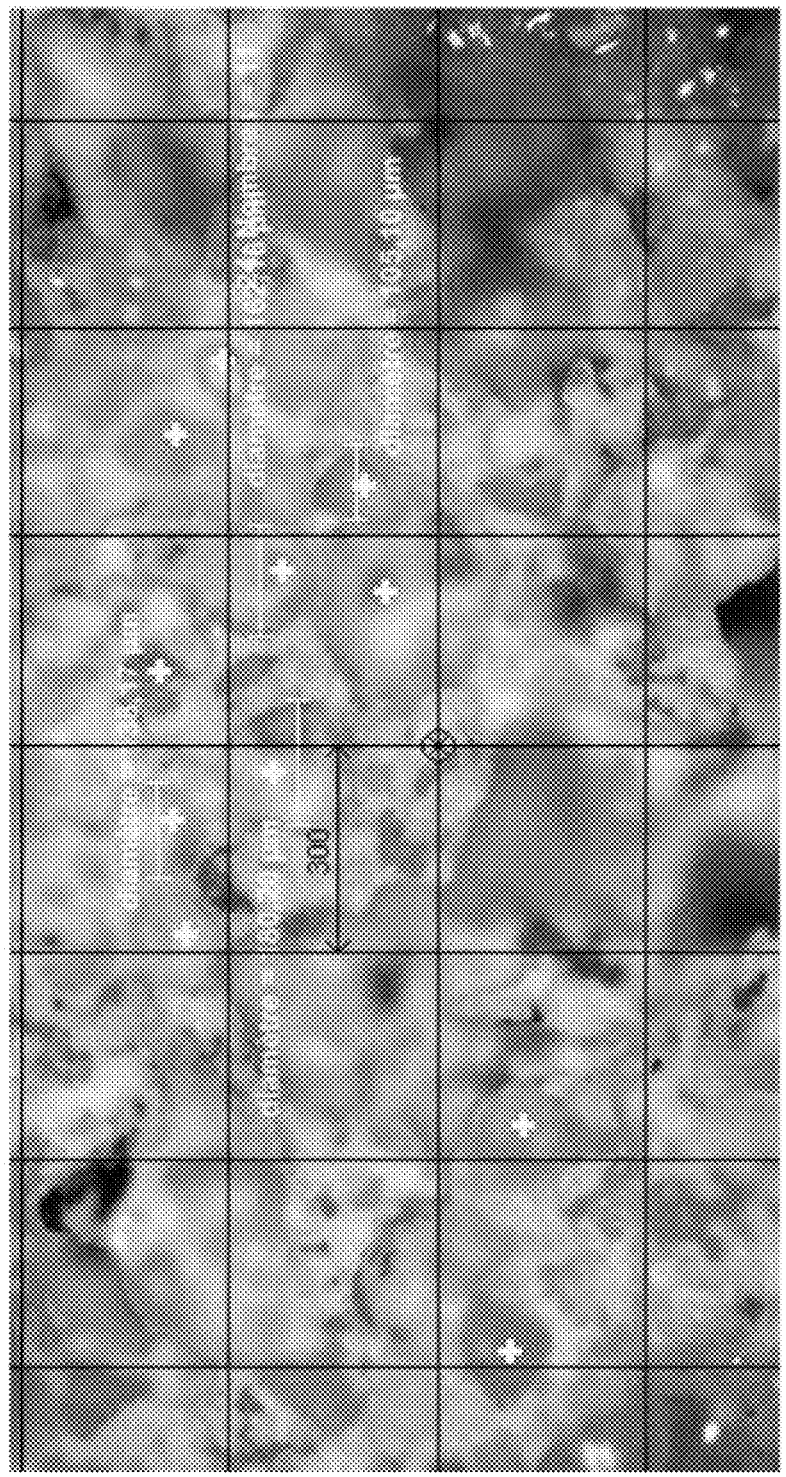

Density: 287 Kg/m$^3$.
Compressive strength at 3 hours: Cs<0.2 MPa, at 24 hours: Cs=0.2 MPa
Coefficient of thermal conductivity: $\lambda$=0.0821 W/m·° C.
Porosity: 88.5%
Measurement of the insulating material pore diameters: the size of the pores that can be observed on FIG. 6 is essentially lower than 200 µm.

II. F. Example 6

High Binder Ratio, with OPC, with Hollow Filler and with or without Reactive Filler

II. F. 1—Preparation of Binders

Following components were added to a container:

| Component | Ettringite binder with hollow and reactive fillers L6 | Ettringite binder with hollow fillers and without Slag L7 |
|---|---|---|
| Hydraulic binder: | | |
| Portland cement 52.5R (Lafarge Le Havre) | 4.5 g | 4.5 g |
| Calcium aluminate Secar 51 ® (Kerneos) | 35.06 g | 35.06 g |
| Anhydrite Francis Flower | 10.52 g | 10.52 g |
| Semi-hydrate Prestia Creation | 1.17 g | 1.17 g |
| Reactive fillers: | | |
| Slag (*) | 5 g | |
| Silica fume Rw Q1 Fuller | 5 g | 5 g |
| Dispersant: | | |
| Compac 500 | 0.36 g | 0.36 g |
| Cellulose ether: | | |
| Tylose H300P2 | 0.10 g | 0.10 g |
| Fillers: | | |
| Durcal 2 | 10 g | 15 g |
| Sand Sifraco BR36 | 28 g | 28 g |
| Water for mixing | 22 g | 22 g |

(*) cf example 4

The components are mixed using an electric mixer for 30 seconds at low speed (graduation 1), then for 1 minute and 30 seconds at high speed (graduation 5). A cement slurry is thus obtained.

II. F. 2—Production of the Aqueous Foam

Mix in a bowl following products:
4 g of a foaming agent Empicol ESC/3L (sodium laureth ether sulfate),
0.1 g of xanthan gum,
0.1 g of lithium sulfate,
92.8 g of water.
The whole is mixed with the electric mixer at high speed for 5 minutes until a homogeneous and compact aqueous foam is produced, with a density of 50 kg·m$^3$.

II. F. 3—Preparation of the Mineral Foam 30 grams of aqueous foam are incorporated into 100 g of cement slurry prepared hereabove by means of the electric mixer for 3 minutes at medium speed (graduation 3).

II. F. 4—Pouring and Drying of the Mineral Foam

The same as in II. C. 4

II. F. 5—Mineral Foam Composition (Binder 1 with Slags and Hollow Fillers and Binder 1 with Hollow Fillers without Slags)

| Composition | % (weight) Binder L6 | % (weight) Binder L7 |
|---|---|---|
| Binder | 32.31 | 32.31 |
| Reactive filler | 6.31 | 3.15 |
| Filler | 24.08 | 27.23 |
| Water | 35.95 | 35.95 |
| Foaming agent | 0.92 | 0.92 |
| Other additives | 0.43 | 0.43 |

II. F. 6—Characterization of the Insulating Material Obtained

Figure 7:
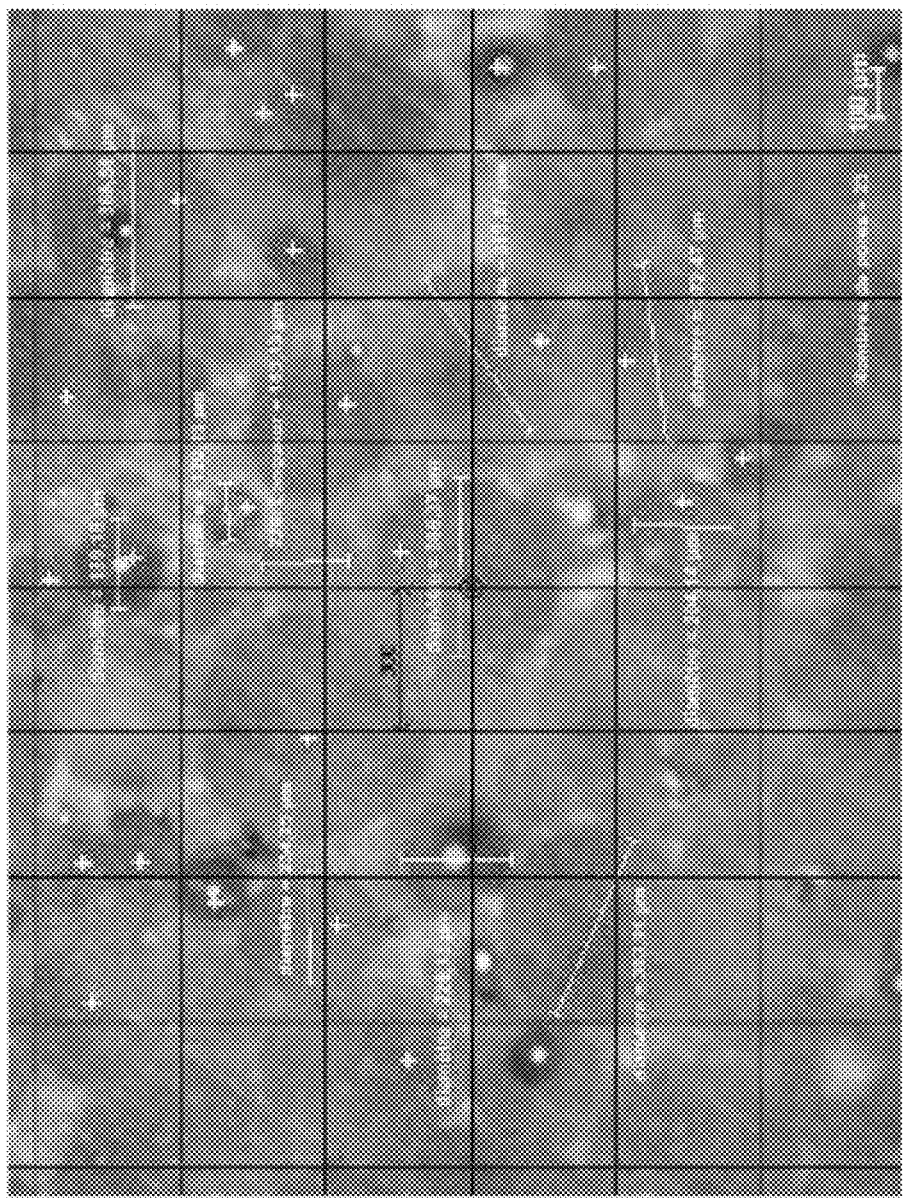
Figure 8:
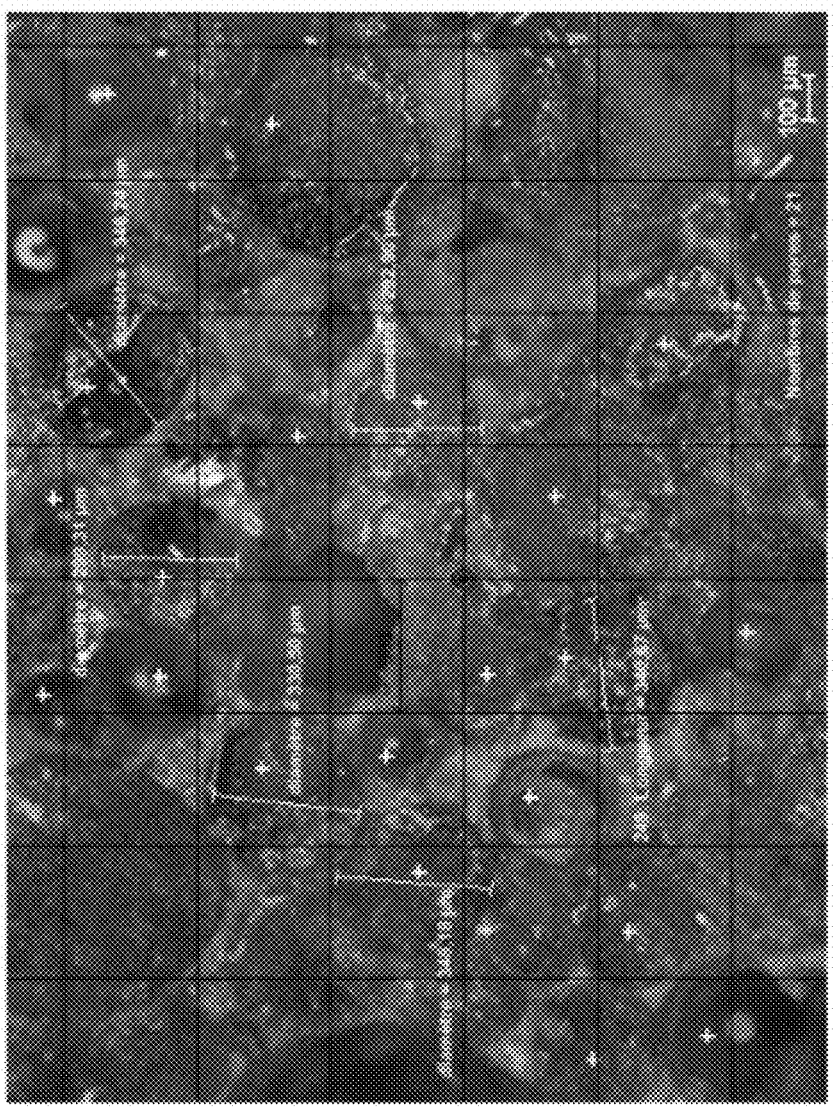

Density: with binder L6 194 Kg/m$^3$.
With binder L7 143 Kg/m$^3$
Porosity: with binder L6 91%
With binder L7 94%
Compressive strength at 3 hours:
With binder L6 Cs=0.2 MPa
With binder L7 Cs<0.2 MPa
Coefficient of thermal conductivity:
With binder L6 $\lambda$=0.053 W/m·° C.
With binder L7 $\lambda$=0.045 W/m·° C.
Measurement of the Insulating Material Pore Diameters:
With binder L6: the pore size that is observed on FIG. 7 is essentially lower than 400 μm.
With binder L7: the pore size that is observed on FIG. 8 is essentially lower than 350 μm.

II. G. Example 7

High Binder Ratio, without OPC, with Hollow Filler of Silica Aerogel Type

II. G. 1—Preparation of the Binder

Following components were added to a container

| Component | Ettringite binder with hollow and reactive fillers L8 |
|---|---|
| Hydraulic binder: | |
| Portland cement 52.5R (Lafarge Le Havre) | — |
| Calcium aluminate Secar 51 ® (Kerneos) | 42 g |
| Semi-hydrate Prestia Creation | 18 g |
| Tartaric acid | 0.1 g |
| Reactive fillers: | |
| Silica fume Rw Q1 Fuller | 5.20 g |
| Hollow filler | |
| Silica aerogel | 11.0 g |
| Dispersant: | |
| Compac 500 | 0.36 g |
| Microfibers of cellulose: | |
| Arbocel ® 40 (CFF) length 0.45-1 μm. | 0.20 g |
| Cellulose ether | |
| Tylose H300P2 | 0.11 g |
| Fillers: | |
| Durcal 2 | 23 g |
| Water for mixing | 30 g |

The components are mixed using an electric mixer for 30 seconds at low speed (graduation 1), then for 1 minute and 30 seconds at high speed (graduation 5). A cement slurry is thus obtained.

II. G. 2—Production of the Aqueous Foam

Mix in a bowl following products:
4 g of a foaming agent Empicol (sodium laureth ether sulfate),
0.1 g of lithium sulfate,
92.8 g of water.
The whole is mixed with the electric mixer at high speed for 5 minutes until a homogeneous and compact aqueous foam is produced, with a density of 50 kg·m$^3$.

II. G. 3—Preparation of the Mineral Foam 30 grams of aqueous foam are incorporated into 100 g of cement slurry prepared hereabove by means of the electric mixer for 3 minutes at medium speed (graduation 3).

II. G. 4—Pouring and Drying of the Mineral Foam

The same as in II. C

II. G. 5—Mineral Foam Composition

| Composition | L8% (by weight) |
|---|---|
| Binder | 35.50 |
| Reactive filler | 3.08 |
| Hollow filler | 6.51 |
| Filler | 13.61 |
| Water | 39.83 |
| Foaming agent | 0.92 |
| Other additives | 0.53 |

II. G. 6—Characterization of the Insulating Material Obtained

Density: 236 Kg/m$^3$.
Porosity: 90.3%

Compressive strength at 3 and 24 hours: Cs<0.2 MPa, Cs28 f=days=0.4 MPa

Coefficient of thermal conductivity: $\lambda$=0.061 W/m·° C.

Figure 9:
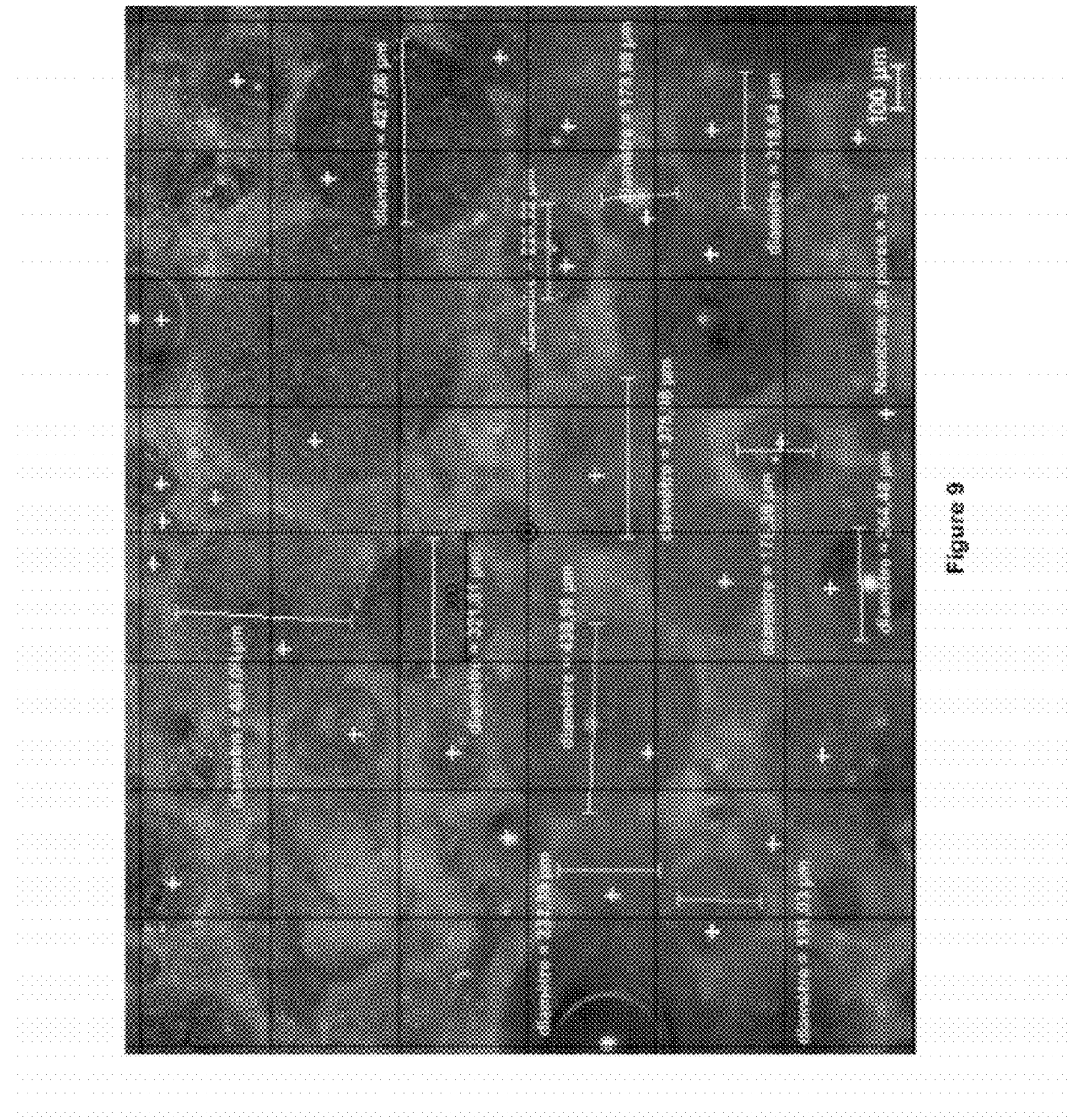

Measurement of the insulating material pore diameters: on FIG. 9 the pore size that is observed on Figure 450 μm

II. H. Example 8

High Binder Ratio, with OPC, Reactive Filler of Silica Fume Type

II. H. 1—Preparation of the Binder

Following components were added to a container

| Component | Ettringite binder with hollow and reactive fillers L9 | Ettringite binder with hollow and reactive fillers L10 |
|---|---|---|
| Hydraulic binder: | | |
| Portland cement 52.5R (Lafarge Le Havre) | 8.25 g | 8.25 g |
| Calcium aluminate Secar 51 ® (Kerneos) | 35.06 g | 35.06 g |
| Anhydrite Francis Flower | 11.69 g | 11.69 g |
| Tartaric acid | 0.1 g | 0.1 g |
| Reactive fillers: | | |
| Slag (*) | — | 5.0 g |
| Silica fume Rw Q1 Fuller | 5.20 g | 5.20 g |
| Dispersant: | | |
| Compac 500 Resin | 0.38 g | 0.11 g |
| Vinnapass 5011L Cellulose ether | 3.20 g | 3.20 g |
| Tylose H300P2 | 0.11 g | 0.11 g |
| Fillers: | | |
| Sand Palvadeau 0-0.315 mm | 16.51 g | 16.51 g |
| Durcal 2 | 19.5 g | 14.5 g |
| Water for mixing | 22 g | 22 g |

(*) cf example 4

The components are mixed using an electric mixer for 30 seconds at low speed (graduation 1), then for 1 minute and 30 seconds at high speed (graduation 5). A cement slurry is thus obtained.

II. H. 2—Production of the Aqueous Foam

Mix in a bowl following products:
1 g of foaming agent Glucopon CSUP 600 (alkyl polyglucoside ether),
0.3 g of Gluadin (wheat protein hydrolyzate),
0.3 g of lithium carbonate
0.1 g of cellulose ether H300P2
98.3 g of water.

The whole is mixed with the electric mixer at high speed for 5 minutes until a homogeneous and compact aqueous foam is produced, with a density of 50 kg·m³.

II. H. 3—Preparation of the Mineral Foam 30 grams of aqueous foam are incorporated into 100 g of cement slurry prepared hereabove by means of the electric mixer for 3 minutes at medium speed (graduation 3).

II. H. 4—Pouring and Drying of the Mineral Foam

The same as in II. C. 4.

II. H. 5—Mineral Foam Composition

| Composition | L9% (by weight) | L10% (by weight) |
|---|---|---|
| Binder | 34.68 | 34.68 |
| Reactive filler | 3.28 | 6.56 |
| Filler | 22.70 | 19.43 |
| Water | 36.23 | 36.23 |
| Foaming agent | 0.62 | 0.62 |
| Other additives | 2.49 | 2.49 |

II. H. 6—Characterization of the Insulating Material Obtained

Density: without Slag 212 Kg/m³. With Slag 300 Kg/m³
Porosity: without Slag 90.3%, with Slag 80%
Compressive strength at 3 hours: Cs<0.2 MPa, Cs at 24 hours: 0.5 MPa with slag and <0.5 MPa without slag. Cs at 28 days without slag: 0.6 MPa
Coefficient of thermal conductivity: $\lambda$=W/m·° C., with slag: 0.102 W/m·° C.

II. I. Example 9

High Binder Ratio, with OPC, Reactive Filler of Silica Fume Type+Hydrophobic Agent

II. I. 1—Preparation of the Binder

Following components were added to a container

| Component | Ettringite binder with reactive fillers L11 |
|---|---|
| Hydraulic binder: | |
| Portland cement 52.5R (Lafarge Le Havre) | 8.25 g |
| Calcium aluminate Secar 51 ® (Kerneos) | 35.06 g |
| Semi-hydrate Prestia creation | 11.69 g |
| Tartaric acid | 0.1 g |
| Reactive fillers: | |
| silica fume Rw Q1 Fuller | 4 g |
| Dispersant: | |
| Compac 500 Resin | 0.38 g |
| Vinnapass 8031H Cellulose ether | 0.7 g |
| Tylose H300P2 | 0.11 g |
| Fillers: | |
| Sand Palvadeau 0-0.315 mm | 17.8 g |
| Durcal 2 | 22 g |
| Water for mixing | 22 g |

The components are mixed using an electric mixer for 30 seconds at low speed (graduation 1), then for 1 minute and 30 seconds at high speed (graduation 5). A cement slurry is thus obtained.

II. I. 2—Production of the Aqueous Foam

Mix in a bowl following products:
7 g of a foaming agent Neopor®600 (animal protein),
0.3 g of lithium carbonate
92.7 g of water
The whole is mixed with the electric mixer at high speed for 5 minutes until a homogeneous and compact aqueous foam is produced, with a density of 50 kg·m³.

II. I. 4—Pouring and Drying of the Mineral Foam

The same as in II. C. 4

II. I. 5—Mineral Foam Composition

| Composition | Formula L11% (by weight) |
|---|---|
| Binder | 34.68 |
| Reactive filler | 2.52 |
| Filler | 25.09 |
| Water | 35.85 |
| Foaming agent | 1.00 |
| Other additives | 0.91 |

II. I. 6—Characterization of the Insulating Material Obtained

Figure 10:
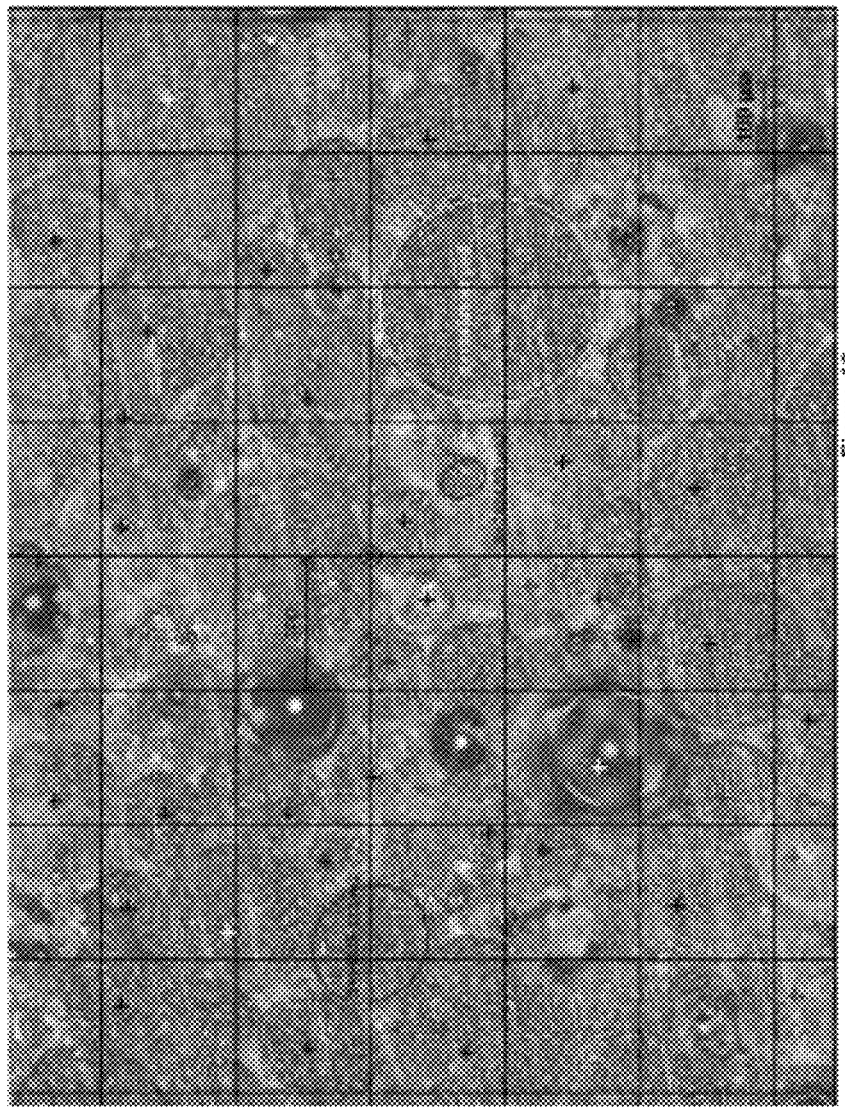

Density: 214 Kg/m³.
Porosity: 90.1%,
Compressive strength at 3 hours: Cs<0.2 MPa, Cs at 28 days: 0.7 MPa
Coefficient of thermal conductivity: λ=0.0545 W/m·° C.
The pore diameters that can be observed on FIG. 10 are essentially lower than 300 μm.

II. J. Example 10

Non Foam Slurry with Hollow Filler

II. J. 1—Preparation of the Binder

Following components were added to a container

| Component | Ettringite binder with hollow and reactive fillers L12 | Comparative binder 100% OPC Ettringite binder LC6 |
|---|---|---|
| Hydraulic binder: | | |
| Portland cement 52.5R (Lafarge Le Havre) | — | 10.0 g |
| Calcium aluminate Secar 51 ® (Kerneos) | 7 g | — |
| Anhydrite Francis Flower | 2.70 g | — |
| Air-slaked lime | 1.0 g | — |
| Semi-hydrate Prestia creation | 0.3 g | — |
| Sodium carbonate | — | 0.5 g |
| Lithium carbonate | 0.066 g | — |
| Citric acid | 0.05 g | — |
| Reactive fillers: | | |
| Slag (*) | 5.0 g | 5.0 g |
| Silica fume Rw Q1 Fuller | 5.0 g | 5.0 g |
| Hollow fillers | | |
| Thermosilit | 20 g | 20 g |
| Dispersant: | | |
| Conpac 500 | 0.36 g | 0.36 g |
| Cellulose ether | | |
| Tylose H300P2 | 0.08 g | 0.08 g |
| Fillers: | | |
| Sand Sifraco BR36 | 30.5 g | 30.5 g |
| Durcal 130 | 26.0 g | 26.0 g |
| Water for mixing | 28 g | 28 g |

(*) cf example 4

The components are mixed using an electric mixer for 30 seconds at low speed (graduation 1), then for 1 minute and 30 seconds at high speed (graduation 5). A cement slurry is thus obtained.

II. J. 2—Characterization of the Insulating Material Obtained

| Mechanical strength | | |
|---|---|---|
| Reflection at 24 h (Mpa) | 1.3 | — |
| Reflection at 3 h (Mpa) | 1.5 | 0.9 |
| Compressive strength (3 h Mpa) | 2.3 | — |
| Compressive strength 24 h (Mpa) | 3.1 | 1.3 |

The invention claimed is:

1. A cellular structure thermal insulation material, comprising
   a) from 20% to 60% by weight of the insulation material of a cement matrix, the cement matrix obtained by hydration of a hydraulic binder that comprises from 10% to 50% of calcium sulfate as compared to the hydraulic binder total weight, and that prior to being contacted with water, comprises at least one phase selected from C3A, CA, C12A7, C11A7CaF2, C4A3$ (Ye'elimite), C2A(1-x)Fx (where x belongs to [0, 1]), and hydraulic amorphous phases having a C/A molar ratio ranging from 0.3 to 15, wherein the cumulative amount of $Al_2O_3$ of said at least one phase ranges from 3% to 70% by weight of the hydraulic binder total weight; and
   b) from 4% to 80% by weight of the insulation material of at least one filler, the at least one filler selected from the group consisting of reactive filler, inert filler, hollow filler, and a mixture thereof,
   said thermal insulation material having a pore volume ranging from 70% to 95% of the total volume, a density lower than or equal to 300 kg/m³, a coefficient of thermal conductivity at 20° C. lower than or equal to 0.2 W/m° C., and presents a cell mean size of less than 500 μm.

2. The cellular structure thermal insulation material according to claim 1, which presents a shrinkage lower than 500 μm/m.

3. The cellular structure thermal insulation material according to claim 1, comprising from 1% to 80% by weight of low density hollow fillers.

4. The mineral foam according to claim 1, which further comprises at least one compound selected from foaming agents, air-entraining agents and gas-generating agents.

5. The cellular structure thermal insulation material according to claim 1, which presents a compressive strength Cs at 3 hours higher than or equal to 0.2 MPa.

6. The cellular structure thermal insulation material according to claim 1, which presents a compressive strength Cs value higher than 0.3 MPa, and a coefficient of thermal conductivity at 20° C. lower than or equal to 0.08 W/m° C.

7. The cellular structure thermal insulation material according to claim 1, which presents after 24 hours a compressive strength Cs value higher than 0.8 MPa, and a coefficient of thermal conductivity at 20° C. ranging from 0.08 to 0.2 W/m° C.

8. The cellular structure thermal insulation material according to claim 1, which presents after 24 hours a compressive strength Cs value higher than 1.5 MPa, and a coefficient of thermal conductivity at 20° C. ranging from 0.08 to 0.2 W/m° C.

9. The cellular structure thermal insulation material according to claim 1, wherein the binder of the insulating material further comprises from 0% to less than 5% by weight, as related to the hydraulic binder total weight, of Portland cement.

10. The cellular structure thermal insulation material according to claim 1, wherein the weight ratio of water to hydraulic binder is in a range of from 0.1 to 0.7.

11. The cellular structure thermal insulation material according to claim 1, wherein the weight ratio of water to hydraulic binder is in a range of from 0.15 to 0.5.

12. The cellular structure thermal insulation material according to claim 1, which presents a cell mean size of less than 300 µm.

13. The cellular structure thermal insulation material according to claim 1, wherein the hydraulic binder comprises from 20% to 40% by weight of calcium sulfate.

14. The cellular structure thermal insulation material according to claim 1, wherein the at least one filler is selected from the group consisting of silica fume, blast furnace slag, steel slag, fly ash, limestone fillers, particulate silica, silicas including pyrogenated and precipitated silicas, silicas recovered in rice husks, diatomaceous silicas, calcium carbonates, calcium silicates, barium sulfate, metakaolins, titanium, iron, zinc, chromium, zirconia, magnesium metal oxides, alumina under its various forms (hydrated or not), alumina hollow beads, boron nitride, lithopone, barium metaborate, calcinated, standard or expanded clays, perlite, vermiculite, pumices, rhyolite, chamotte, talc, mica, optionally hollow, glass beads or expanded glass granules, silicate foam grains, silica aerogels, sands, broken gravels, gravels, pebbles, carbonate black, silicon carbide, corundum, rubber granules, wood and straw.

15. The cellular structure thermal insulation material according to claim 1, having a density ranging from 80 kg/m³ to 250 kg/m³.

16. The cellular structure thermal insulation material according to claim 1, wherein the cumulative amount of $Al_2O_3$ of said at least one phase ranges from 20% to 30% by weight of the hydraulic binder total weight.

* * * * *